US012552742B2

(12) United States Patent
Pandey et al.

(10) Patent No.: US 12,552,742 B2
(45) Date of Patent: Feb. 17, 2026

(54) PROCESS FOR THE PREPARATION OF SEMAGLUTIDE SIDE CHAIN

(71) Applicant: FRESENIUS KABI ONCOLOGY LIMITED, New Delhi (IN)

(72) Inventors: Maneesh Kumar Pandey, Gurugram (IN); Sonu Prasad Shukla, Gurugram (IN); Sachin Nain, Gurugram (IN); Sandeep Sandeep, Gurugram (IN); Sridhar Male, Gurugram (IN); Sarbjot Singh Sokhi, Gurugram (IN); Govind Singh, Gurugram (IN); Saswata Lahiri, Gurugram (IN); Walter Cabri, Bologna (IT)

(73) Assignee: FRESENIUS KABI ONCOLOGY LTD, New Delhi (IN)

( * ) Notice: Subject to any disclaimer, the term of this patent is extended or adjusted under 35 U.S.C. 154(b) by 697 days.

(21) Appl. No.: 17/995,857

(22) PCT Filed: Apr. 9, 2021

(86) PCT No.: PCT/IB2021/052948
§ 371 (c)(1),
(2) Date: Oct. 9, 2022

(87) PCT Pub. No.: WO2021/205388
PCT Pub. Date: Oct. 14, 2021

(65) Prior Publication Data
US 2023/0295077 A1 Sep. 21, 2023

(30) Foreign Application Priority Data
Apr. 10, 2020 (IN) .............................. 202011015687

(51) Int. Cl.
C07C 269/06 (2006.01)
C07C 231/02 (2006.01)
C07C 231/12 (2006.01)
C07D 207/46 (2006.01)
C07D 249/18 (2006.01)

(52) U.S. Cl.
CPC .......... *C07C 269/06* (2013.01); *C07C 231/02* (2013.01); *C07C 231/12* (2013.01); *C07D 207/46* (2013.01); *C07D 249/18* (2013.01)

(58) Field of Classification Search
CPC .................................................... C07C 269/06
See application file for complete search history.

(56) References Cited

FOREIGN PATENT DOCUMENTS

| CN | 104 356 224 A | 2/2015 |
|---|---|---|
| CN | 108 203 462 A | 6/2018 |
| CN | 110 041 219 A | 7/2019 |
| WO | WO 2006/097537 A2 | 9/2006 |
| WO | WO 2016/209707 A1 | 12/2016 |
| WO | 2017050157 A1 | 3/2017 |
| WO | 2019120639 A1 | 6/2019 |

OTHER PUBLICATIONS

Clavé et al., "A novel heterotrifunctional peptide-based cross-linking reagent for facile access to bioconjugates. Applications to peptidefluorescent labelling and immobilisation," *Organic & Biomolecular Chemistry* 6(17): 3065-3078 (2008).
European Patent Office, International Search Report in International Application No. PCT/IB2021/052948 (Oct. 4, 2021).
European Patent Office, Written Opinion in International Application No. PCT/IB2021/052948 (Oct. 4, 2021).
International Bureau of WIPO, International Preliminary Report on Patentability in International Application No. PCT/IB2021/052948 (Oct. 6, 2022).
European Patent Office, Communication Pursuant to Rule 114(2) EPC in European Patent Application No. 21729629.2 (May 22, 2025).

*Primary Examiner* — John S Kenyon
(74) *Attorney, Agent, or Firm* — Leydig, Voit & Mayer, Ltd.

(57) ABSTRACT

The present invention relates to an improved process for the preparation of a compound of Formula (1), The invention also provides improved processes for the preparation of intermediates used in the synthesis of Formula (1). The compound of Formula (1) is used in the synthesis of Semaglutide.

14 Claims, No Drawings

PROCESS FOR THE PREPARATION OF SEMAGLUTIDE SIDE CHAIN

CROSS REFERENCE TO RELATED PATENT APPLICATION(S)

This patent application is the U.S. national stage of International Patent Application No. PCT/IB2021/052948, filed on 9 Apr. 2021, which claims the benefits of Indian Patent Application No. IN 202011015687, filed on 10 Apr. 2020, the disclosures of which are incorporated by reference herein in their entireties for all purposes.

FIELD OF THE INVENTION

The present invention relates to an improved process for the preparation of a compound of Formula 1, used in the synthesis of Semaglutide.

Formula 1

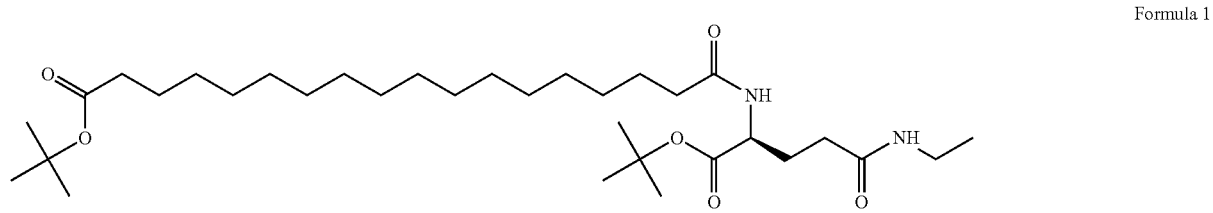

The present invention also relates to an improved process for the preparation of a compound of Formula G, used in the synthesis of the compound of Formula 1.

Formula G

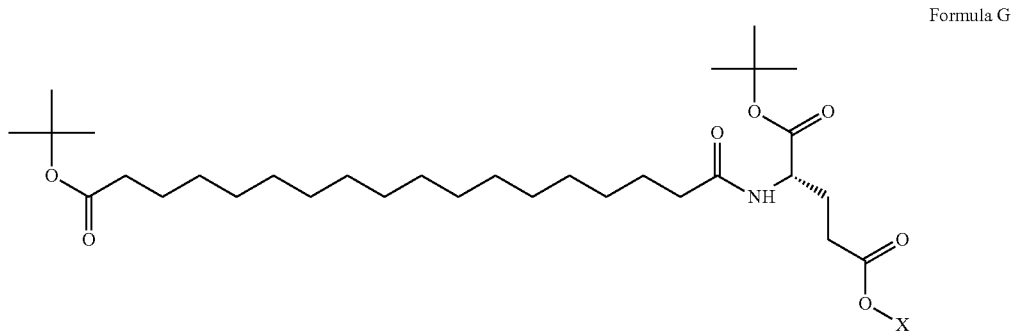

Wherein, COOX is an activated ester

The present invention further relates to an improved process for the preparation of a compound of Formula I, used in the synthesis of the compound of Formula 1.

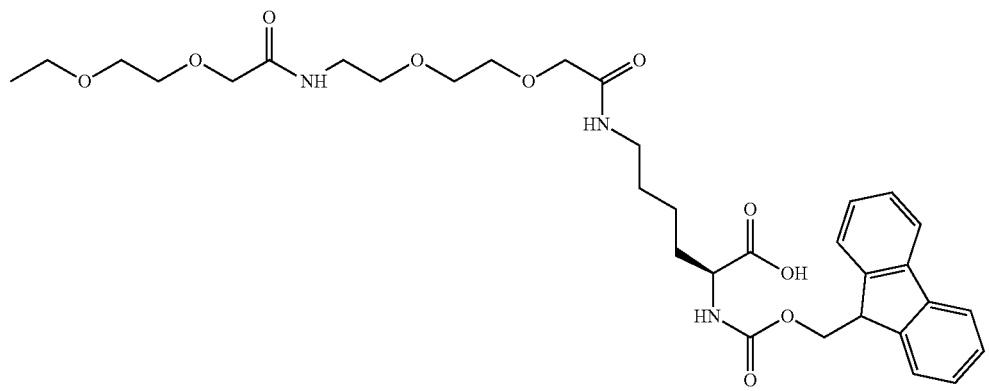

Formula I

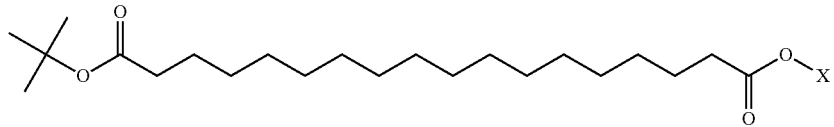

Wherein, COOX is an activated ester

The present invention further relates to an improved process for the preparation of a compound of Formula E, used in the synthesis of compound of Formula 1.

Formula E

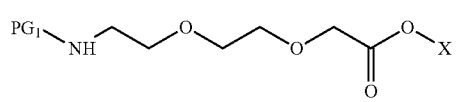

wherein $PG_1$ is a protecting group, and COOX is an activated ester

BACKGROUND OF THE INVENTION

Semaglutide, a human GLP-1 receptor agonist (or GLP-1 analog) is represented by the Formula 2,

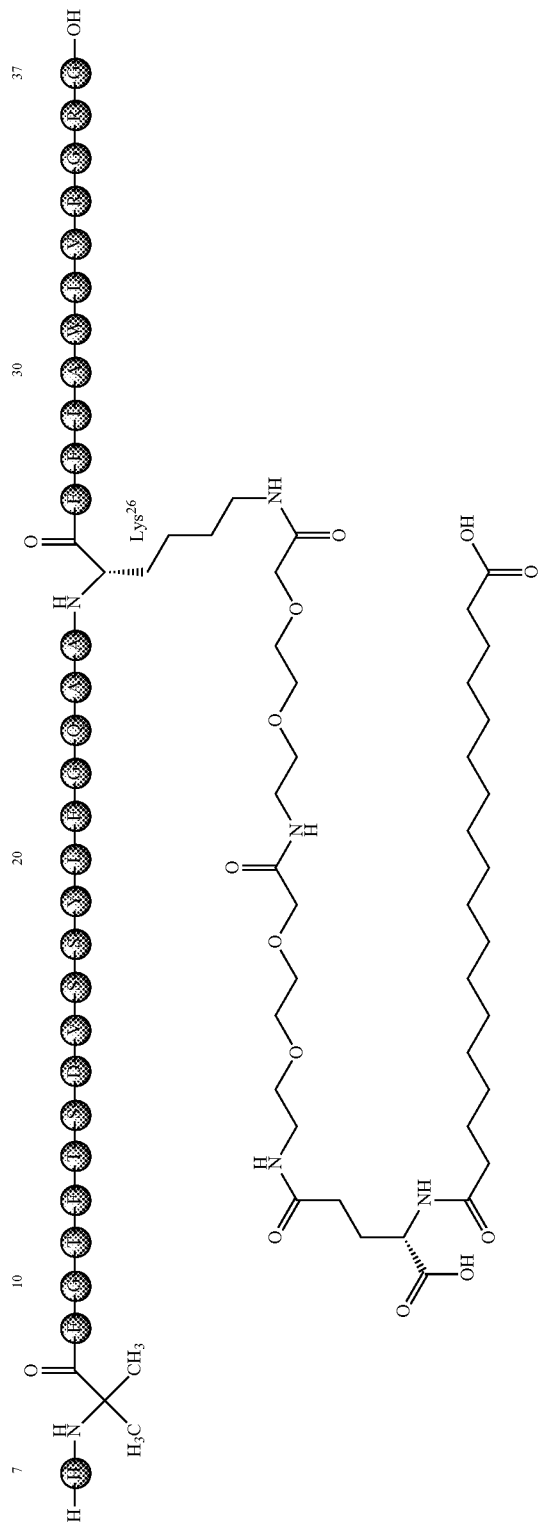

Semaglutide (a pharmaceutical composition containing Semaglutide is marketed under the tradename Ozempic®, Novo Nordisk) is indicated as an adjunct to diet and exercise to improve glycemic control in adults with type 2 diabetes mellitus.

Semaglutide, as represented by Formula 2 is disclosed in WO 2006/097537. WO 2006/097537 provides a process wherein the Lys[20] side chain is attached to full-chain peptide in one step in solution phase. The process for the preparation of Lys[20] side chain or Semaglutide side chain of Formula 1 is reported in CN 104356224 and CN 110041219.

It is a further objective of the present invention to provide an improved and commercially viable process for the synthesis of Semaglutide side chain.

SUMMARY OF THE INVENTION

In a first aspect, the present invention relates to a process for the preparation of a compound of Formula 1,

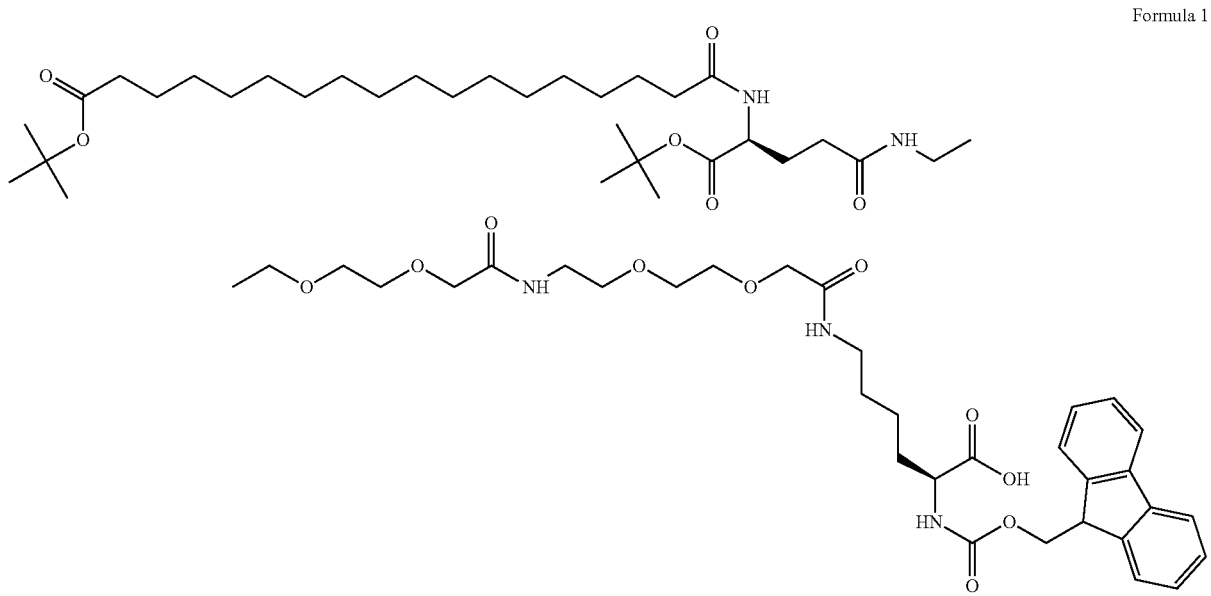

Formula 1

The process disclosed in CN 104356224 involves tedious work up procedures such as pH adjustment, filtration, washings, back extraction etc. for the isolation of intermediate compounds prepared during the synthesis. The process also involves recrystallization steps using ethanol. Moreover, the process disclosed in CN 104356224 is a less efficient process, as some of the steps require overnight stirring.

The process disclosed in CN 110041219, requires stringent operations such as column chromatography for the purification/isolation of reaction intermediates. This process requires Pd/C at various reaction steps, which makes this process less suitable for the commercial purposes.

From the foregoing, it is apparent that the reported methods for the preparation of side chain of Semaglutide require stringent operational conditions, which are not only tedious but also result in significant yield loss. The processes require long reaction time for the completion at several stages including tedious work up procedures and purification steps.

Thus, there remains the need to formulate an efficient, simple and industrially viable synthetic process which can overcome the drawbacks of the prior art.

OBJECT OF THE INVENTION

It is an object of the present invention to overcome the above-mentioned drawbacks of the prior art.

It is another objective of the present invention to avoid tedious and long work-up procedures during the synthesis.

comprising the steps of:
a) coupling a compound of Formula A;

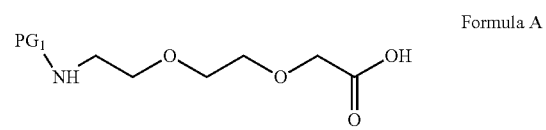

Formula A wherein PG$_1$ is a protecting group, cleavable under non-basic conditions,
by activation of the carboxylic acid, with a compound of Formula B;

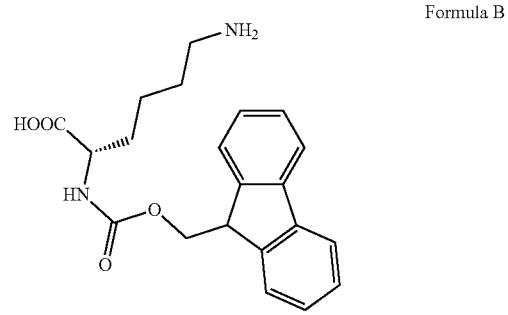 [SMILES: NCCCC[C@H](NC(=O)OCC1c2ccccc2-c2ccccc21)C(=O)O]

Formula B to obtain a compound of Formula C;

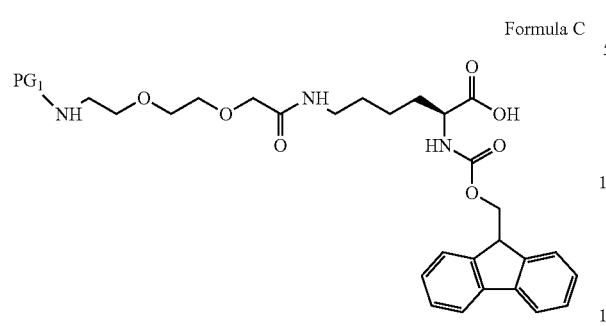
Formula C b) de-protecting the compound of Formula C to obtain a compound of Formula D or its salt;

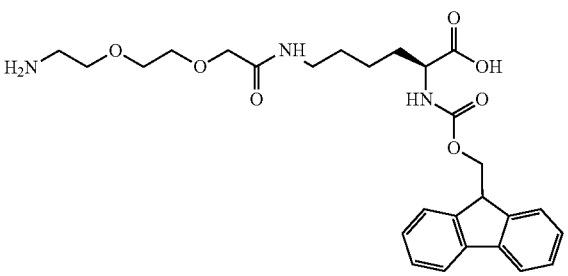
Formula D c) reacting the compound of Formula D or its salt with a compound of Formula E;

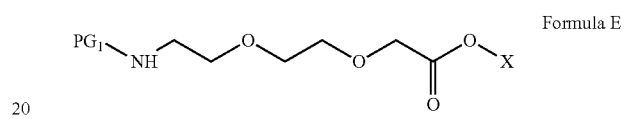
Formula E

Wherein COOX is an activated ester in the presence of a base, to obtain a compound of Formula F;

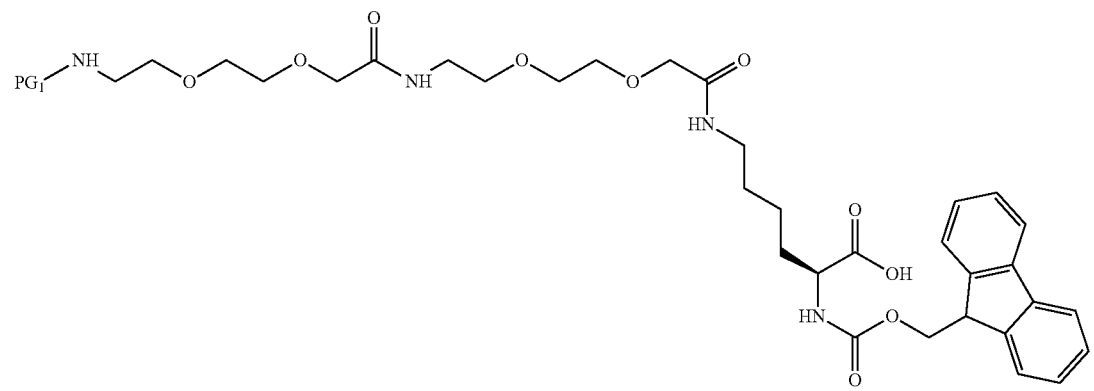
Formula F d) de-protecting the compound of Formula F;
e) reacting the reaction mixture of step d) with a compound of Formula G;

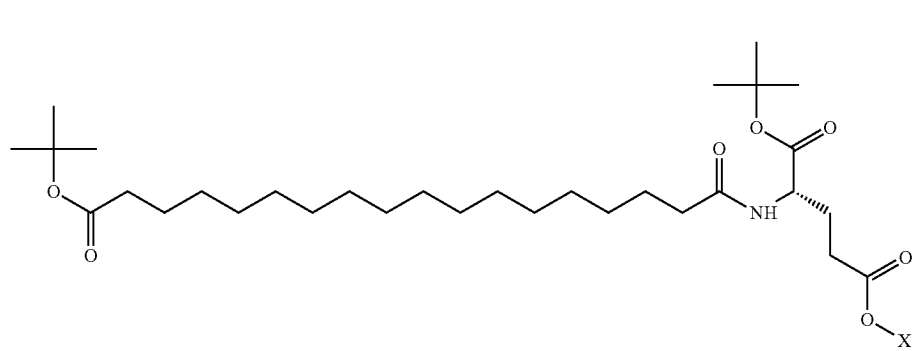
Formula G

Wherein, COOX is an activated ester in the presence of a base to obtain the compound of Formula 1;

Wherein:

i) the compound of Formula E used in step c) is prepared by a process comprising the reaction of a compound of Formula $E_1$;

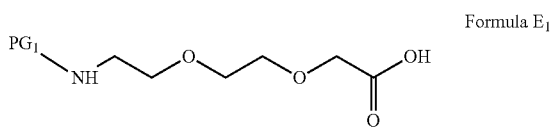

Formula $E_1$ with a carboxylic acid activator;

and, ii) the compound of Formula G used in step e) is prepared by a process comprising the steps of:

f1) coupling a compound of Formula H;

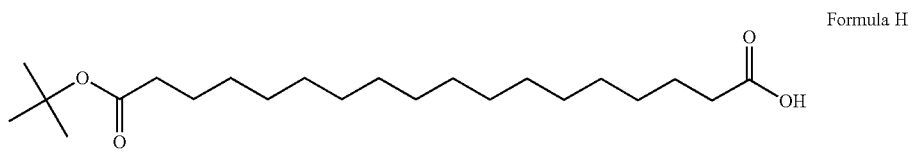 [SMILES: CC(C)(C)OC(=O)CCCCCCCCCCCCCCCCC(=O)O]

Formula H by activation of the carboxylic acid, with a compound of Formula J

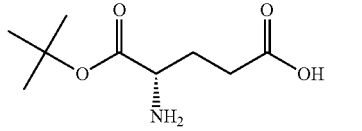

Formula J to obtain a compound of Formula K;

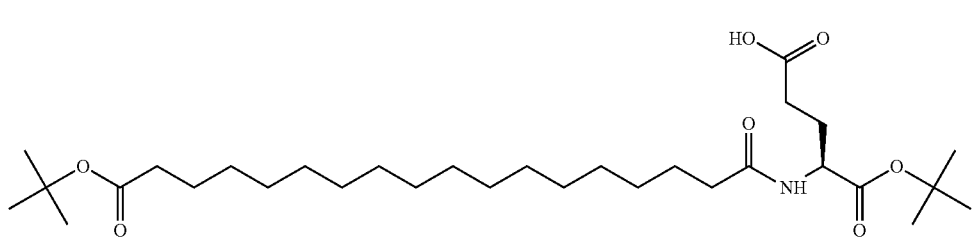

Formula K f2) reacting the compound of Formula K with a carboxylic acid activator to obtain the compound of Formula G.

In another aspect, the present invention relates to a process for the preparation of a compound of Formula C;

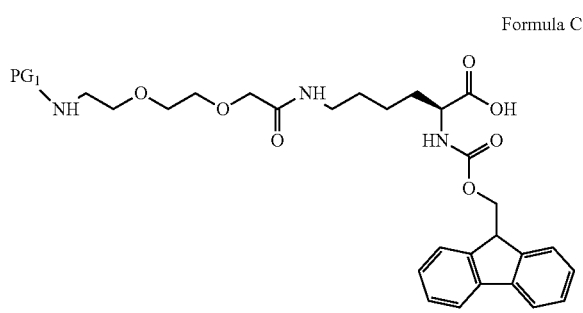

Formula C wherein PG₁ is a protecting group, cleavable under non-basic conditions,
comprising the steps of:
a) reacting a compound of Formula A;

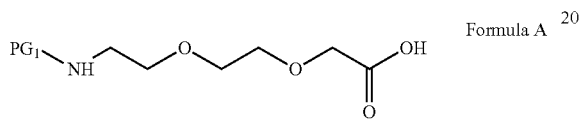

Formula A with a carboxylic acid activator in the presence of N-(3-Dimethylaminopropyl)-N'-ethylcarbodiimide hydrochloride in a polar aprotic solvent selected from N,N-dimethylformamide, dimethyl sulfoxide and tetrahydrofuran, preferably N,N-dimethylformamide; and b) reacting the reaction mixture of step a) with a compound of Formula B;

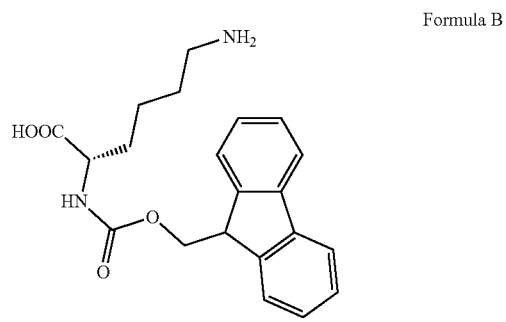 [SMILES: NCCCC[C@H](NC(=O)OCC1c2ccccc2-c2ccccc21)C(=O)O]

Formula B in the presence of N'N-diisopropylethylamine to obtain a compound of Formula C.

In another aspect, the present invention relates to a process for the preparation of a compound of Formula G;

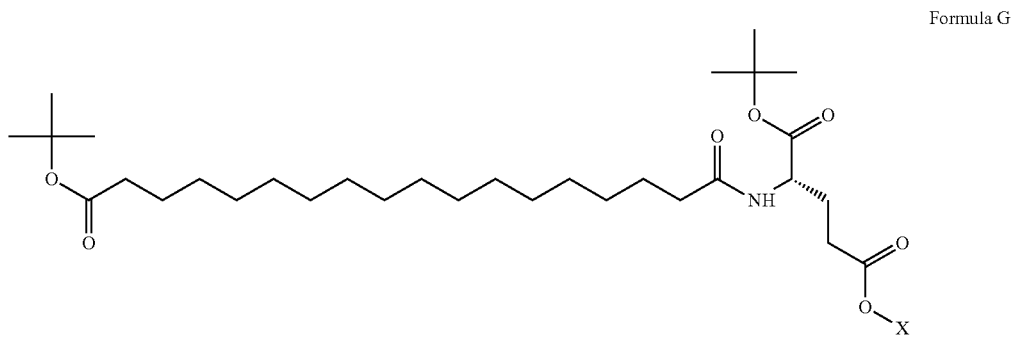

Formula G

Wherein, COOX is an activated ester
comprising a reaction of a compound of Formula K;

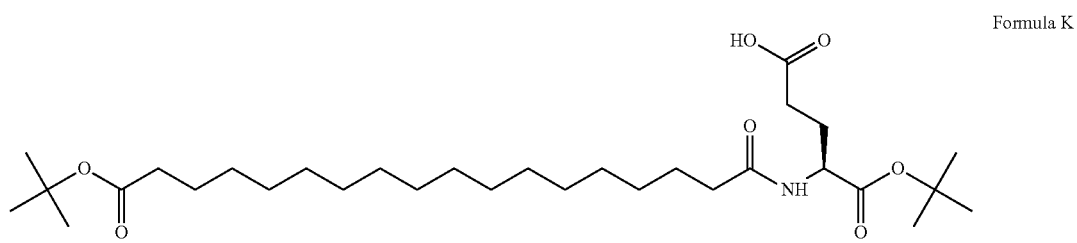 [SMILES: CC(C)(C)OC(=O)CCCCCCCCCCCCCCCCC(=O)N[C@@H](CCC(=O)O)C(=O)OC(C)(C)C]

Formula K with a carboxylic acid activator in the presence of N-(3-Dimethylaminopropyl)-N'-ethylcarbodiimide hydrochloride.

The aspect of the invention provides a process for the preparation of a compound of Formula I;

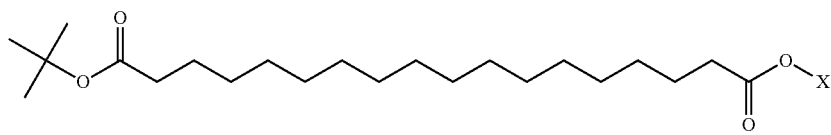

Formula I

Wherein, COOX is an activated ester comprising the reaction of a compound of Formula H;

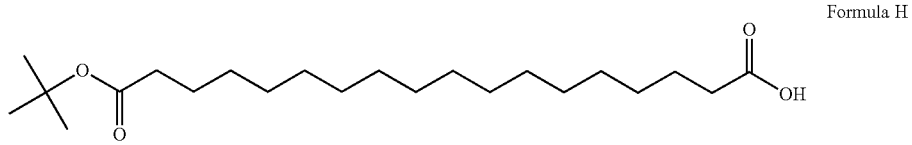 [SMILES: CC(C)(C)OC(=O)CCCCCCCCCCCCCCCCC(=O)O]

Formula H with a carboxylic acid activator in the presence of N-(3-Dimethylaminopropyl)-N'-ethylcarbodiimide hydrochloride in a solvent to obtain a compound of Formula I.

Another aspect of the invention is to provide a compound of Formula EB;

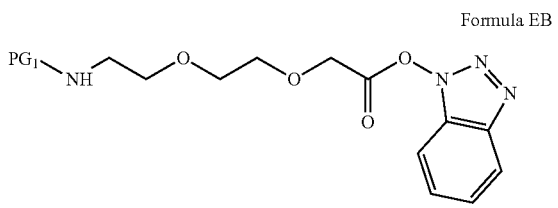

Formula EB wherein $PG_1$ is a protecting group.

In another aspect, the present invention provides a process for the preparation of a compound of Formula E;

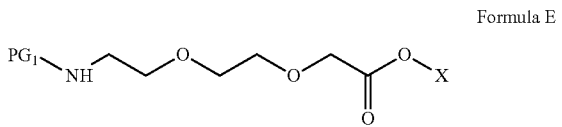

Formula E wherein $PG_1$ is a protecting group, and COOX is an activated ester comprising a reaction of a compound of Formula $E_1$;

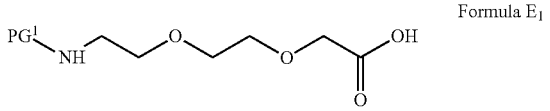

Formula $E_1$ with a carboxylic acid activator in the presence of N-(3-Dimethylaminopropyl)-N'-ethylcarbodiimide hydrochloride.

Another aspect of the present invention provides the use of the compounds of Formula C, G, I and E for the preparation of the Semaglutide side chain of Formula 1.

Definitions

The following definitions are used in connection with the present application unless the context indicates otherwise.

The term "Coupling" refers to a reaction where an amide linkage is formed by reacting carboxylic acid with an amine. Preferably, the coupling is carried out in the presence of a coupling agent. Examples of coupling agent include but are not limited to benzotriazol-1-yl-oxytripyrrolidinophosphonium hexafluorophosphate (PyBOP), 3-[Bis(dimethylamino)methyliumyl]-3H-benzotriazol-1-oxide hexafluorophosphate (HBTU), 2-(1H-Benzotriazole-1-yl)-1,1,3,3-tetramethylaminium tetrafluoroborate (TBTU), N-Ethyl-N'-(3-dimethylaminopropyl)carbodiimide hydrochloride, N,N'-Dicyclohexylcarbodiimide and N,N'-Diisopropylcarbodiimide. The preferred coupling agent is N-Ethyl-N'-(3-dimethylaminopropyl)carbodiimide hydrochloride.

The term "carboxylic acid" refers to an organic compound that contains a —COOH group.

The term "activation of carboxylic acid" refers to conversion of —OH of the carboxylic acid into a good leaving group by reacting with a carboxylic acid activator to result in an activated ester. Examples of carboxylic acid activators include but are not limited to N-hydroxysuccinimide (HOSu), N-hydroxy-5-norbornene2,3-dicarboximide (HONB), 1-hydroxybenzotriazole (HOBt), 6-chloro-1-hydroxybenzotriazole, (6-Cl-HOBt), 1-hydroxy-7-azabenzotriazole (HOAt), 3-hydroxy-4-oxo-3,4-dihydro-1,2,3-benzotriazine (HODhbt), ethyl 1-hydroxy-1H-1,2,3-triazole-4-carboxylate (HOCt) and N-hydroxytetrazole (HOt). The preferred carboxylic acid activator is selected from N-hydroxysuccinimide (HOSu) and 1-hydroxybenzotriazole (HOBt). Accordingly, the activated esters COOX are preferably COOSu, COONB, COOBt, COOAt, COODhbt, COOCt, COOt, most preferably COOX is selected from the group consisting of COOSu and COOBt.

The term "activated ester" refers to an ester functional group that is highly susceptible toward nucleophilic attack. An activated ester undergoes the same reactions as their inactivated analogues but do so more rapidly. An activated ester can be prepared by a reaction of carboxylic acid function with a carboxylic acid activator.

The term "protecting group" refers to a temporarily attached group to decrease reactivity of a functional group so that the protected functional group does not react under synthetic conditions to which the molecule is subjected in one or more subsequent steps. For the purpose of the present invention, examples of protecting group PG1 include but are not limited to Carbobenzyloxy (Cbz), p-Methoxybenzyl carbonyl (Moz or MeOZ), tert-butoxycarbonyl (t-BOC), 9-Fluorenylmethyloxycarbonyl (Fmoc), Acetyl (Ac), Benzoyl (Bz), Benzyl (Bn), p-Methoxybenzyl (PMB), Tosyl (Ts) and Troc (trichloroethyl chloroformate). The preferred protecting group is tert-butoxycarbonyl (t-BOC).

The term "protecting group cleavable under non-basic conditions" refers to a protecting group which can be cleaved under acidic and/or neutral conditions. Examples of protecting groups cleavable under non-basic conditions include but are not limited to tert-butoxycarbonyl (t-BOC), triphenylmethyl, methanesulfonyl, acetyl and benzoyl. The preferred protecting group cleavable under non-basic conditions is tert-butoxycarbonyl (t-BOC). The protection and deprotection methods are well known in the art (see notably "Protective groups in organic synthesis", Greene T. W. and Wuts P. G. M., Wiley-Interscience, 1999).

The term "ambient temperature" refers to a temperature ranging from about 15° C. to 35° C., preferably to a temperature ranging from about 20° C. to 30° C., more preferably to a temperature of 20-25° C.

DETAILED DESCRIPTION OF THE INVENTION

The present invention relates to a process for the preparation of the side chain of Semaglutide of Formula I;

In an embodiment, the process comprises a step for the preparation of a compound of Formula C;

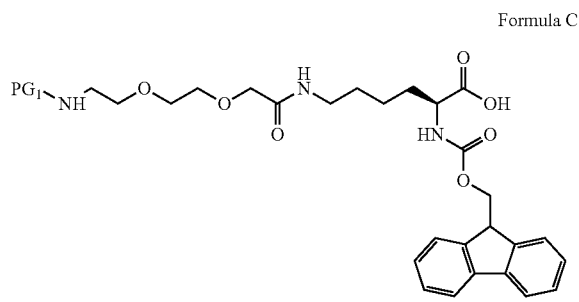

Formula C

In one embodiment, the compound of Formula C is prepared by coupling a compound of Formula A;

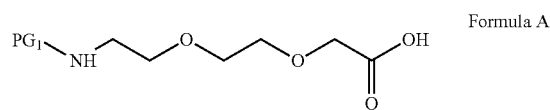

Formula A wherein PG$_1$ is a protecting group, cleavable under non-basic conditions by activation of the carboxylic acid, with a compound of Formula B;

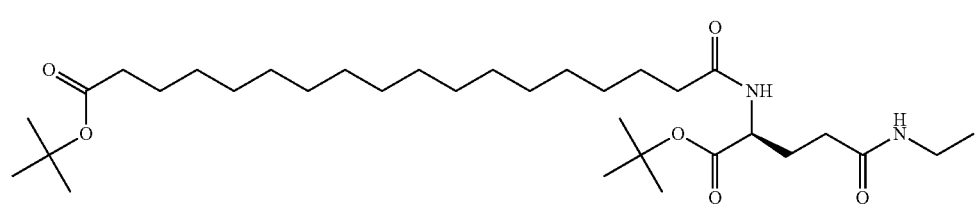

Formula 1

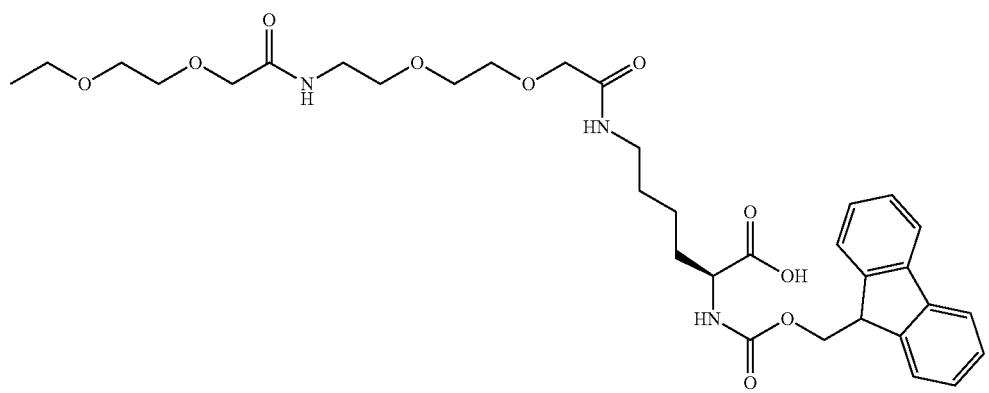

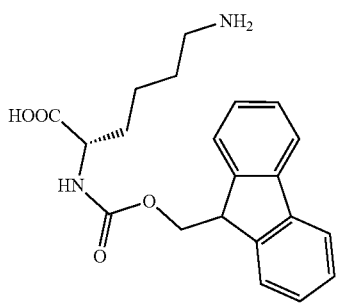

Formula B

The activation of the carboxylic acid is carried out in the presence of a carboxylic acid activator, preferably selected from the N-hydroxysuccinimide (HOSu), N-hydroxy-5-norbornene2,3-dicarboximide (HONB), 1-hydroxybenzotriazole (HOBt), 6-chloro-1-hydroxybenzotriazole, (6-Cl-HOBt), 1-hydroxy-7-azabenzotriazole (HOAt), 3-hydroxy-4-oxo-3,4-dihydro-1,2,3-benzotriazine (HODhbt), ethyl 1-hydroxy-1H-1,2,3-triazole-4-carboxylate (HOCt) and N-hydroxytetrazole (HOt). In a preferred embodiment, the compound of Formula A is reacted with a carboxylic acid activator 1-hydroxybenzotriazole (HOBt). The resulting reaction mixture is reacted with a compound of Formula B to obtain a compound of Formula C.

$PG_1$ is preferably selected from tert-butoxycarbonyl (t-BOC), triphenylmethyl, methanesulfonyl, methanesulfonyl, acetyl and benzoyl. The coupling is carried out in the presence of a coupling agent selected from benzotriazol-1-yl-oxytripyrrolidinophosphonium hexafluorophosphate (PyBOP), 3-[Bis(dimethylamino)methyliumyl]-3H-benzotriazol-1-oxide hexafluorophosphate (HBTU), 2-(1H-Benzotriazole-1-yl)-1,1,3,3-tetramethylaminium tetrafluoroborate (TBTU), N-Ethyl-N'-(3-dimethylaminopropyl)carbodiimide hydrochloride, N,N'-Dicyclohexylcarbodiimide and N,N'-Diisopropylcarbodiimide, preferably, N-(3-Dimethylaminopropyl)-N'-ethylcarbodiimide hydrochloride.

In a preferred embodiment, the compound of Formula A [wherein PG1 is tert-butoxycarbonyl (t-BOC)] is reacted with 1-hydroxybenzotriazole (HOBt). The resulting reaction mixture is reacted with a compound of Formula B to obtain a compound of Formula C.

Preferably, the coupling is carried out in the presence of a base selected from triethylamine, N,N-diisopropylethylamine, sodium bicarbonate and sodium carbonate, preferably N,N-diisopropylethylamine.

The reaction may be carried out in a solvent. The solvent may be selected from the group comprising N,N-dimethylformamide, dimethylsulfoxide, aromatic hydrocarbons, such as toluene, benzene, xylene or the like, saturated hydrocarbons, such as cyclohexane, hexane or the like, halogenated hydrocarbons, such as dichloromethane, chloroform, 1,2-dichloroethane or the like, ethers, such as tetrahydrofuran, diethylether, dioxane, 1,2-dimethoxyethane or the like, esters, such as methyl acetate, ethyl acetate or the like, ketones, such as acetone, diisobutyl ketone, cyclohexanone, methylcyclohexanone, methyl ethyl ketone, methyl isobutyl ketone, acetylacetone or the like, nitriles, such as acetonitrile or the like, alcohols, such as methanol, ethanol, t-butanol, isopropanol or the like, water, ethers, such as tetrahydrofuran, diethylether, dioxane or the like, and mixtures thereof. Preferably, the solvent is polar aprotic solvent selected from N,N-dimethylformamide, dimethyl sulfoxide and tetrahydrofuran. More preferably, the solvent is N,N-dimethylformamide.

In a preferred embodiment, the compound of Formula A [wherein PG1 is tert-butoxycarbonyl (t-BOC)] is reacted with 1-hydroxybenzotriazole (HOBt) in the presence of N,N-dimethylformamide. The resulting reaction mixture is reacted with a compound of Formula B in the presence of N'N-diisopropylethylamine to obtain a compound of Formula C. More preferably, the resulting reaction mixture is reacted with a compound of Formula B in the presence of a base and water to obtain a compound of Formula C.

In one aspect of the invention, the compound of Formula A is reacted with a carboxylic acid activator in the presence of N-(3-Dimethylaminopropyl)-N'-ethylcarbodiimide hydrochloride in a polar aprotic solvent selected from N,N-dimethylformamide, dimethyl sulfoxide and tetrahydrofuran. The resulting reaction mixture is reacted with a compound of Formula B in the presence of NN-diisopropylethylamine and water.

In a preferred embodiment, the compound of Formula A (wherein $PG_1$ is t-BOC) is reacted with 1-hydroxybenzotriazole (HOBt) in the presence of N-(3-Dimethylaminopropyl)-N'-ethylcarbodiimide hydrochloride in N,N-dimethylformamide at an ambient temperature. More preferably, the reaction mixture is stirred for 2-3 hours at an ambient temperature. Subsequently, the reaction mixture is reacted with a compound of Formula B in the presence of NN-diisopropylethylamine and water at an ambient temperature.

Surprisingly, the inventors of the present invention found that the compound of Formula C can be isolated in a very simple and commercially viable method. The compound of Formula C can be isolated by adjusting the pH of the reaction mixture from 3 to 4 and evaporating the solvent. The pH of the solution can be adjusted using diluted HCl or diluted phosphoric acid. The compound can be extracted using ethyl acetate or dichloromethane.

This highly efficient procedure overcomes the disadvantages of the prior art procedures described above. The process of the present invention avoids tedious and time-consuming steps of work up procedure for the isolation of the intermediate during the synthesis of the compound of Formula C. The reaction step is completed in a significant shorter time (appx. 2-4 hours) compared to the prior art process which requires overnight stirring at one stage. Moreover, the work up procedure for the isolation of the compound of Formula C is easy to operate at commercial scale. The use of ethanol as needed in the prior art procedure is disadvantageous in commercial manufacturing and this disadvantage is also overcome by the present invention.

The present invention has the advantage of providing the desired compound of Formula C which is very low in impurities.

The compound of Formula C can be converted to a compound of Formula 1 by any method known in the art, for example, using a process as reported in CN104356224.

In one embodiment, the compound of Formula C is converted to the compound of Formula 1 by following the process, which is another aspect of the invention. The process comprises a step for the preparation of a compound of Formula D or its salt;

Formula D

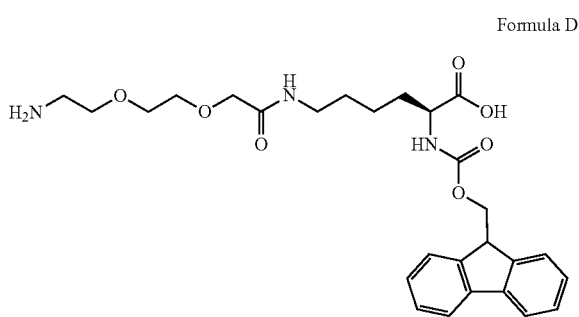 [SMILES: NCCOCCOCC(=O)NCCCC[C@H](NC(=O)OCC1c2ccccc2-c2ccccc21)C(=O)O]

by de-protection of the compound of Formula C. The formation of corresponding salts depends on the corresponding acid used for de-protection of compound of Formula C.

In a preferred embodiment, the compound of Formula D or its salt is prepared by treating a compound of Formula C with an acid, optionally in the presence of a solvent. Preferably, the deprotection is carried out using 1 to 10 equivalents of acid, more preferably 1 to 3 equivalents at ambient temperature for at least 1 minute, preferably over a time period ranging from 1 minute to 5 hours, more preferably from 1 to 2 hours.

The acid may be selected from the group comprising mineral acids, such as hydrochloric acid, hydrobromic acid, phosphoric acid, metaphosphoric acid, nitric acid and sulphuric acid; and organic acids, such as tartaric acid, acetic acid, trifluoroacetic acid, citric acid, malic acid, lactic acid, fumaric acid, benzoic acid, glycolic acid, gluconic acid, succinic acid, alkylsulphonic acids, such as methanesulphonic, ethanesulphonic acids, ethane-1, 2-disulfonic acid and 2-hydroxyethanesulfonic acid, arylsulphonic acids, such as benzene sulfonic acid, 2-naphthalenesulfonic acid, p-toluenesulphonic acid and naphthalene-1,5-disulfonic acid, preferably p-toluenesulphonic acid.

The solvent may be selected from the group comprising non-polar solvents, such as hexane, benzene, toluene, dioxane, ethers, halogenated hydrocarbons, such as dichloromethane, chloroform, 1,2-dichloroethane or the like, polar aprotic solvents, such as tetrahydrofuran, ethyl acetate, acetone, N,N-dimethylformamide, acetonitrile, dimethyl sulfoxide or the like, polar protic solvents, such as methanol, ethanol, t-butanol, n-butanol, isopropanol, formic acid, acetic acid, nitromethane or the like, water, esters, such as methyl acetate, ethyl acetate or the like, ketones, such as acetone, diisobutyl ketone, cyclohexanone, methylcyclohexanone, methyl ethyl ketone, methyl isobutyl ketone, acetylacetone or the like, preferably dichloromethane.

In a preferred embodiment, the de-protection is carried out by treating a compound of Formula C with p-toluenesulphonic acid in the presence of a solvent such as dichloromethane. The reaction mixture is stirred for 1 to 2 hours, at ambient temperature to obtain a compound of Formula D or its salt.

The compound of Formula D or its salt can be converted to a compound of Formula 1 by any method known in the art, for example, using a process as reported in CN104356224.

In one embodiment, the compound of Formula D or its salt is converted to the compound of Formula 1 by the process steps of the present invention.

The process comprises a step for the preparation of a compound of Formula F;

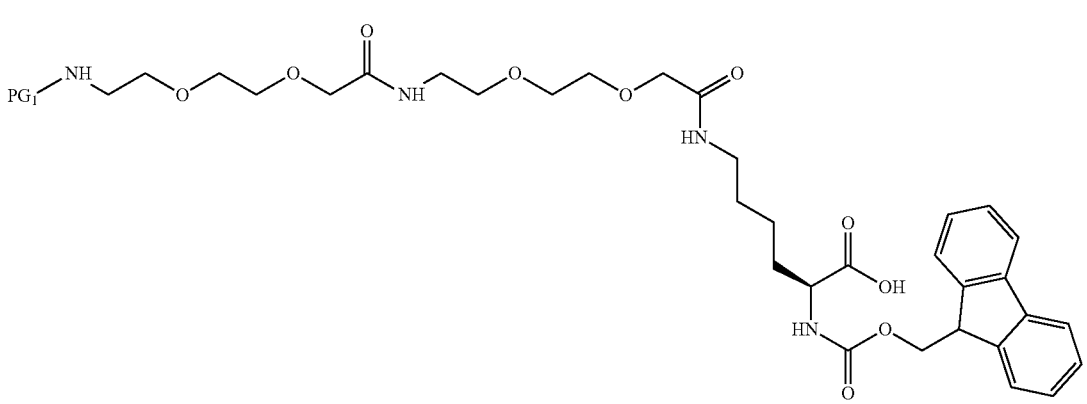

Formula F

The compound of Formula F can be prepared by reacting a compound of Formula D or its salt with a compound of Formula E,

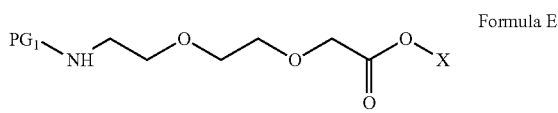

Formula E

Wherein COOX is an activated ester and PG1 is a protecting group, cleavable under non-basic conditions; in the presence of a base.

X is selected from Succinimide, 5-norbornene2,3-dicarboximide, Benzotriazole, 6-chloro-benzotriazole, Azabenzotriazole, Oxo-3,4-dihydro-1,2,3-benzotriazine, Ethyl 1,2, 3-triazole-4-carboxylate and tetrazole, preferably Benzotriazole. The base may be selected from triethylamine, N'N-diisopropylethylamine, sodium bicarbonate and sodium carbonate, preferably sodium bicarbonate.

In a preferred embodiment, the compound of Formula D or its salt, preferably the para toluenesulphonic acid addition salt of Formula D is reacted with a compound of Formula E in the presence of sodium bicarbonate in water. Preferably, the reaction is carried out at −10 to 30 degree Celsius, more preferably at 20 to 30 degree Celsius. The reaction mixture is stirred for 2 to 3 hours.

The present invention has an advantage of providing the desired compound of Formula F which is very low in impurities.

The compound of Formula F can be converted to a compound of Formula 1 by any method known in the art, for example, using a process as reported in CN104356224.

In one embodiment, the compound of Formula F is converted to the compound of Formula 1 by following the process, which is another aspect of the invention.

The compound of Formula E as used in the present invention can be prepared by using methods known in the art, for example, using a process as reported in CN104356224.

In one embodiment, the compound of Formula E is prepared by the process steps as per the present invention. The process comprises a step for the preparation of a compound of Formula E by reacting a compound of Formula $E_1$;

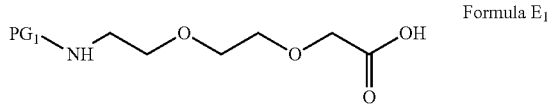

Formula $E_1$ $PG_1$ is a protecting group with a carboxylic acid activator. The carboxylic acid activator may be selected from the N-hydroxysuccinimide (HOSu), N-hydroxy-5-norbornene2,3-dicarboximide (HONB), 1-hydroxybenzotriazole (HOBt), 6-chloro-1-hydroxybenzotriazole, (6-Cl-HOBt), 1-hydroxy-7-azabenzotriazole (HOAt), 3-hydroxy-4-oxo-3,4-dihydro-1,2,3-benzotriazine (HODhbt), ethyl 1-hydroxy-1H-1,2,3-triazole-4-carboxylate (HOCt) and N-hydroxytetrazole (HOt).

In a preferred embodiment, the compound of Formula E is prepared by reacting a compound of Formula $E_1$ with 1-hydroxybenzotriazole. More preferably, the reaction is carried out in the presence of a coupling agent, optionally in the presence of a solvent. The coupling agent may be selected from benzotriazol-1-yl-oxytripyrrolidinophosphonium hexafluorophosphate (PyBOP), 3-[Bis(dimethylamino)methyliumyl]-3H-benzotriazol-1-oxide hexafluorophosphate (HBTU), 2-(1H-Benzotriazole-1-yl)-1,1,3,3-tetramethylaminium tetrafluoroborate (TBTU), N-Ethyl-N'-(3-dimethylaminopropyl)carbodiimide hydrochloride, N,N'-Dicyclohexylcarbodiimide and N,N'-Diisopropylcarbodiimide, preferably, N-(3-Dimethylaminopropyl)-N'-ethylcarbodiimide hydrochloride. The solvent may be a nitrile solvent selected from acetonitrile and propionitrile or mixture thereof, preferably acetonitrile.

In an embodiment, the compound of Formula $E_1$ is reacted with 1-Hydroxybenzotriazole in the presence of N-(3-Dimethylaminopropyl)-N'-ethylcarbodiimide hydrochloride in acetonitrile at an ambient temperature to obtain a compound of Formula EB;

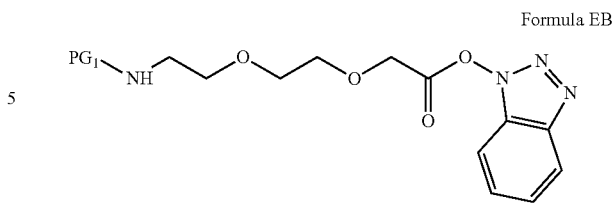

Formula EB wherein $PG_1$ is a protecting group.

The reaction mixture is stirred for 2 to 3 hours. The compound of Formula EB can be obtained by evaporating the solvent. Thus, one aspect of the present invention provides a novel compound of Formula EB.

Surprisingly, the inventors of the present invention have found that the compound of Formula E prepared by the present invention does not need to be purified as described in the prior art, but can be isolated by evaporation of the solvent, if present. It has been also found that the compound of Formula E prepared by the present invention can directly be used (i.e. without isolating) for the preparation of the compound of Formula F. This avoids stringent operations of the isolation and makes the process for the preparation of compound of Formula I very cost effective.

Thus, the present invention has an advantage to provide a process for the preparation of a compound of Formula E, where reaction mixture can directly be used for the preparation of a compound of Formula 1.

The compound of Formula F can be converted to the compound of Formula 1 by the process steps of the present invention. The process comprises a step of de-protection of the compound of Formula F.

The de-protection of the compound of Formula F can be carried out in the presence of an acid, optionally in the presence of a solvent. Preferably, the deprotection is carried out using 1 to 10 equivalents of acid, more preferably 1 to 3 equivalents at ambient temperature for at least 1 minute, preferably over a time period ranging from 1 minute to 5 hours, more preferably from 1 to 2 hours.

The acid may be selected from the group comprising mineral acids, such as hydrochloric acid, hydrobromic acid, phosphoric acid, metaphosphoric acid, nitric acid and sulphuric acid, and organic acids, such as tartaric acid, acetic acid, trifluoroacetic acid, citric acid, malic acid, lactic acid, fumaric acid, benzoic acid, glycolic acid, gluconic acid, succinic acid, alkylsulphonic acids such as methanesulphonic, ethanesulphonic acids, ethane-1, 2-disulfonic acid and 2-hydroxyethanesulfonic acid, arylsulphonic acids, such as benzene sulfonic acid, 2-naphthalenesulfonic acid, p-toluenesulphonic acid and naphthalene-1,5-disulfonic acid; preferably p-toluenesulphonic acid is used in a solvent such as tetrahydrofuran, ethyl acetate, dichloromethane and acetonitrile. In a preferred embodiment, the de-protection is carried out by treating a compound of Formula F with p-toluenesulphonic acid in the presence of a solvent such as dichloromethane. The reaction mixture is stirred for 1 to 2 hours. The solvent is evaporated to obtain a white solid compound. In one aspect of the invention, a solid compound is obtained after evaporation of the solvent.

The obtained compound can be converted to a compound of Formula 1 by any method known in the art, for example, using a process as reported in CN104356224.

In one embodiment, the obtained compound is converted to the compound of Formula 1 by the process steps as per the present invention. The process comprises a step of reacting the solid compound obtained after de-protection of compound of Formula F with a compound of Formula G;

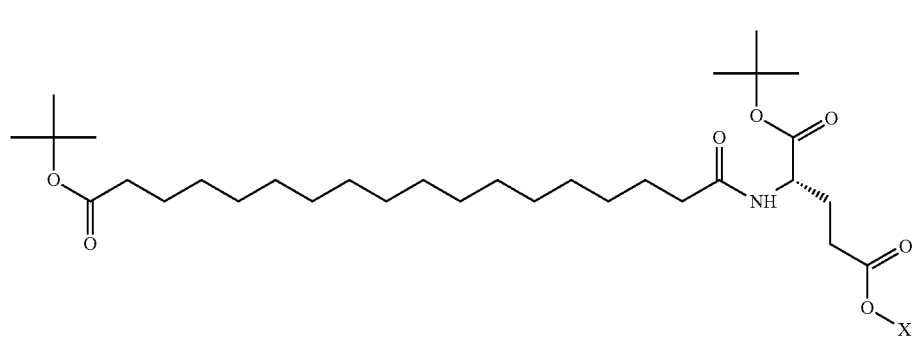

Formula G

Wherein, COOX is an activated ester in the presence of a base.

The base may be selected from the group comprising triethylamine, N'N-diisopropylethylamine, sodium bicarbonate and sodium carbonate, preferably the base is sodium bicarbonate.

The reaction may be carried out in a solvent. The solvent may be selected from the group comprising N,N-dimethylformamide, dimethylsulfoxide, ethers, such as tetrahydrofuran, dioxane, 1,2-dimethoxyethane or the like, esters, such as methyl acetate, ethyl acetate or the like, ketones, such as acetone, diisobutyl ketone, cyclohexanone, methylcyclohexanone, methyl ethyl ketone, acetylacetone or the like, nitriles, such as acetonitrile or the like, alcohols, such as methanol, ethanol, t-butanol, isopropanol or the like, water and mixtures thereof, preferably acetonitrile and water.

In a preferred embodiment, the compound obtained after de-protection of the compound of Formula F is reacted with a compound of Formula G in acetonitrile and water in the presence of sodium carbonate at an ambient temperature. The compound of Formula 1 can be isolated by adjusting pH of the solution 3-4 using diluted HCl or phosphoric acid. Solvent was evaporated and compound can be extracted using ethylacetate. The compound can be recrystallized using diisopropylether to give a white solid. The process of the present invention provides compound of Formula 1 with high yield.

The compound of Formula G used in the process can be prepared by any method known in the art, for example, using a process as reported in CN104356224.

In one embodiment, the compound of Formula G is prepared by the process steps as per the present invention. The process comprises a step of reacting a compound of Formula K, The carboxylic acid activator may be selected from the N-hydroxysuccinimide (HOSu), N-hydroxy-5-norbornene2, 3-dicarboximide (HONB), 1-hydroxybenzotriazole (HOBt), 6-chloro-1-hydroxybenzotriazole, (6-Cl-HOBt), 1-hydroxy-7-azabenzotriazole (HOAt), 3-hydroxy-4-oxo-3,4-dihydro-1,2,3-benzotriazine (HODhbt), ethyl 1-hydroxy-1H-1,2,3-triazole-4-carboxylate (HOCt) and N-hydroxytetrazole (HOt).

In a preferred embodiment, the compound of Formula G is prepared by reacting a compound of Formula K with N-hydroxysuccinimide (HOSu). More preferably, the reaction is carried out in the presence of a reagent selected from benzotriazol-1-yl-oxytripyrrolidinophosphonium hexafluorophosphate (PyBOP), 3-[Bis(dimethylamino)methyliumyl]-3H-benzotriazol-1-oxide hexafluorophosphate (HBTU), 2-(1H-Benzotriazole-1-yl)-1,1,3,3-tetramethylaminium tetrafluoroborate (TBTU), N-Ethyl-N'-(3-dimethylaminopropyl)carbodiimide hydrochloride, N,N'-Dicyclohexylcarbodiimide and N,N'-Diisopropylcarbodiimide, preferably, N-(3-Dimethylaminopropyl)-N'-ethylcarbodiimide hydrochloride, optionally in the presence of a solvent.

The solvent may be selected from the group comprising of N,N-dimethylformamide, dimethylsulfoxide, aromatic hydrocarbons such as toluene, benzene, xylene or the like or saturated hydrocarbons such as cyclohexane, hexane or the like or halogenated hydrocarbons such as dichloromethane, chloroform, 1,2-dichloroethane or the like or ethers such as tetrahydrofuran, diethylether, dioxane, 1,2-dimethoxyethane or the like or esters such as methyl acetate, ethyl acetate or the like or ketones such as acetone, diisobutyl ketone, cyclohexanone, methylcyclohexanone, methyl ethyl ketone, methyl isobutyl ketone, acetylacetone or the like or nitriles such as acetonitrile or the like or alcohols such as methanol, ethanol, t-butanol, isopropanol or the like or water or ethers such as tetrahydrofuran, diethylether, dioxane or the like or in a mixed solvent thereof or the like, preferably dichloromethane.

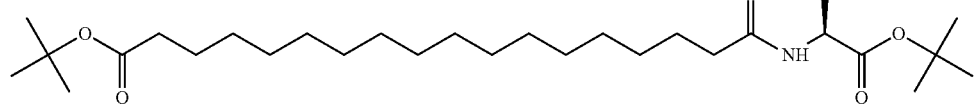

Formula K with a carboxylic acid activator.

In a preferred embodiment, the compound of Formula K is reacted with N-Hydroxybenzotriazole in the presence of N-(3-Dimethylaminopropyl)-N'-ethylcarbodiimide hydrochloride in dichloromethane at an ambient temperature.

The compound of Formula G can be isolated by washing the reaction mixture with sodium bicarbonate and brine solution. The residue is concentrated under vacuum and crystallized using diisopropyl ether.

The inventors of the present invention surprisingly found that the process of the present invention avoids long and tedious work up procedure for the isolation and crystallization of the compound of Formula G.

The compound of Formula K used in the process can be prepared by using methods known in the art, for example, using a process as reported in CN104356224.

The compound of Formula K is prepared by coupling a compound of Formula H;

Formula H by activation of the carboxylic acid, with a compound of Formula J

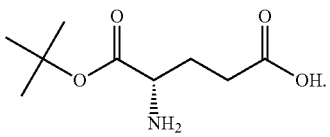

Formula J

The activation of the carboxylic acid is carried out in the presence of a carboxylic acid activator selected from N-hydroxysuccinimide (HOSu), N-hydroxy-5-norbornene2,3-dicarboximide (HONB), 1-hydroxybenzotriazole (HOBt), 6-chloro-1-hydroxybenzotriazole, (6-Cl-HOBt), 1-hydroxy-7-azabenzotriazole (HOAt), 3-hydroxy-4-oxo-3,4-dihydro-1,2,3-benzotriazine (HODhbt), ethyl 1-hydroxy-1H-1,2,3-triazole-4-carboxylate (HOCt) and N-hydroxytetrazole (HOt).

Preferably, the coupling is carried out in the presence of a base selected from triethylamine, N'N-diisopropylethylamine, sodium bicarbonate and sodium carbonate, preferably sodium bicarbonate.

The reaction may be carried out in a solvent. The solvent may be selected from the group comprising of N,N-dimethylformamide, dimethylsulfoxide, aromatic hydrocarbons such as toluene, benzene, xylene or the like or saturated hydrocarbons such as cyclohexane, hexane or the like or halogenated hydrocarbons such as dichloromethane, chloroform, 1,2-dichloroethane or the like or ethers such as tetrahydrofuran, diethylether, dioxane, 1,2-dimethoxyethane or the like or esters such as methyl acetate, ethyl acetate or the like or ketones such as acetone, diisobutyl ketone, cyclohexanone, methylcyclohexanone, methyl ethyl ketone, methyl isobutyl ketone, acetylacetone or the like or nitriles such as acetonitrile or the like or alcohols such as methanol, ethanol, t-butanol, isopropanol or the like or water or ethers such as tetrahydrofuran, diethylether, dioxane or the like or in a mixed solvent thereof or the like.

In one embodiment of the process, an intermediate compound of Formula I is isolated during the process for the preparation of a compound of Formula K. The process for the preparation of the compound of Formula I comprises a reaction of the compound of Formula H with a carboxylic acid activator in the presence of N-(3-Dimethylaminopropyl)-N'-ethylcarbodiimide hydrochloride.

The reaction may be carried out in a solvent. The solvent is selected from dichloromethane, chloroform, acetone, acetonitrile, tetrahydrofuran, dimethylsulphoxide, N,N-dimethylformamide and mixtures thereof, preferably dichloromethane.

The inventors of the present invention found that the compound of Formula I prepared by the process of present invention can be isolated by following a simple procedure. The resulting compound of Formula I can be isolated using dichloromethane and concentrated under vacuum.

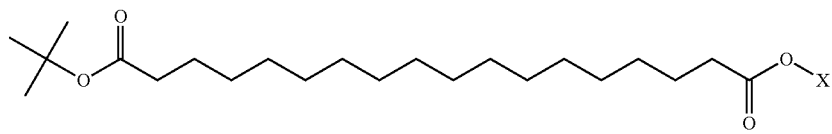

Formula I

Wherein, COOX is an activated ester

Preferably, the compound of Formula I can be crystallized using isopropyl alcohol.

The process known in the art for the isolation of the compound of Formula I require tedious work-up procedure which require several solvent washings and subsequently water washings, which results in the loss of yield of the product.

Thus, one aspect of the invention provides a process for the preparation of a compound of Formula I.

The compound of Formula I is reacted with a compound of Formula J in the presence of sodium bicarbonate.

The reaction may be carried out in a solvent. The solvent may be selected from the group comprising of N,N-dimethylformamide, dimethylsulfoxide or ethers such as tetrahydrofuran, dioxane, 1,2-dimethoxyethane or the like or esters such as methyl acetate, ethyl acetate or the like or ketones such as acetone, diisobutyl ketone, cyclohexanone, methylcyclohexanone, methyl ethyl ketone, acetylacetone or the like or nitriles such as acetonitrile or the like or alcohols such as methanol, ethanol, t-butanol, isopropanol or the like or water or ethers such as tetrahydrofuran, dioxane or the like or in a mixed solvent thereof or the like or mixture thereof, preferably tetrahydrofuran and water.

In a preferred embodiment, the compound of Formula I is reacted with a compound of Formula J in the presence of sodium bicarbonate in tetrahydrofuran and water to obtain a compound of Formula K. The reaction mixture is allowed to stir for 1 to 2 hours.

Thus, one aspect of the invention provides a process for the preparation of a compound of Formula K.

Experimental

Detailed experimental parameters according to the present invention are provided by the following examples, which are intended to be illustrative and not limiting of all possible embodiments of the invention.

EXAMPLES

Example-1

Preparation of $N^6$-(2,2-dimethyl-4,13-dioxo-3,8,11-trioxa-5-azatridecan-13-yl)-$N^2$—{[(9H-fluoren-9-yl)methoxy]carbonyl}-L-lysine

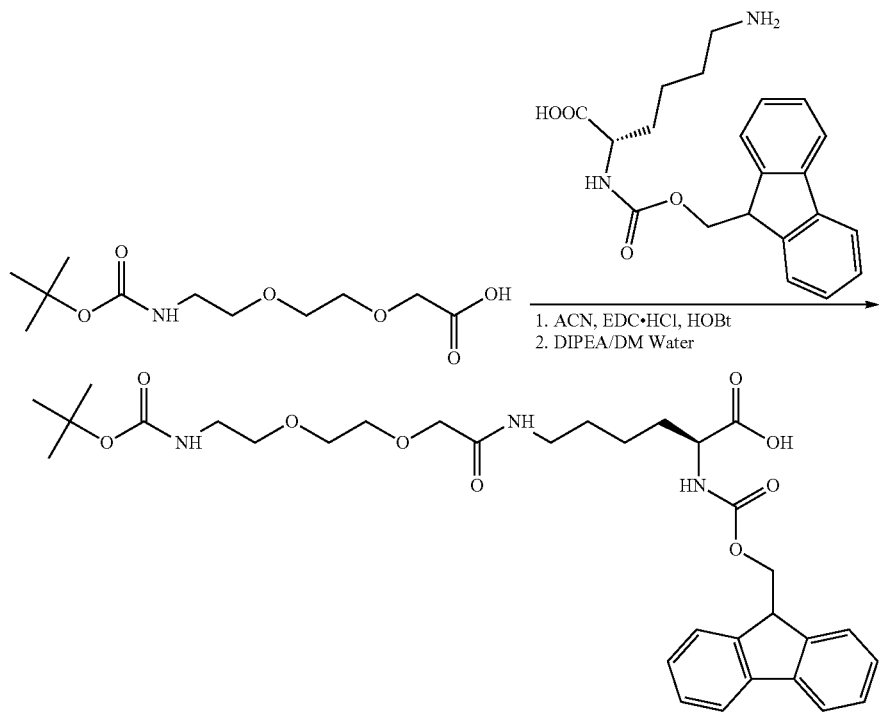

EDC·HCl (9.46 g) was added to the mixture of 2,2-dimethyl-4-oxo-3,8,11-trioxa-5-azatridecan-13-oic acid (10.0 g) and N-Hydroxy benzotriazole (5.13 g) in 50 ml of N,N-dimethylformamide at ambient temperature. The resulting mixture was stirred for 3 hours at ambient temperature. This reaction mass was added drop-wise to the mixture of $N^2$—{[(9H-fluoren-9-yl)methoxy]carbonyl}-L-lysine (14.0 g) and N,N-diisopropyl ethyl amine (10 g) in water (50 ml). After reaction completion, pH of the reaction mixture was adjusted to 3.0-3.5 with diluted phosphoric acid. Solvent was removed by evaporation and reaction mixture was extracted in ethyl acetate. Solid was isolated by addition of Diisopropyl ether followed by filtration and drying (18.5 g). Reaction yield is ca. 80% (Purity 99%).

Example-2

Preparation of $N^6$-(2,2-dimethyl-4,13,22-trioxo-3,8,11,17,20-pentaoxa-5,14-diazadocosan-22-yl)-$N^2$—{[(9H-fluoren-9-yl)methoxy]carbonyl}-L-lysine

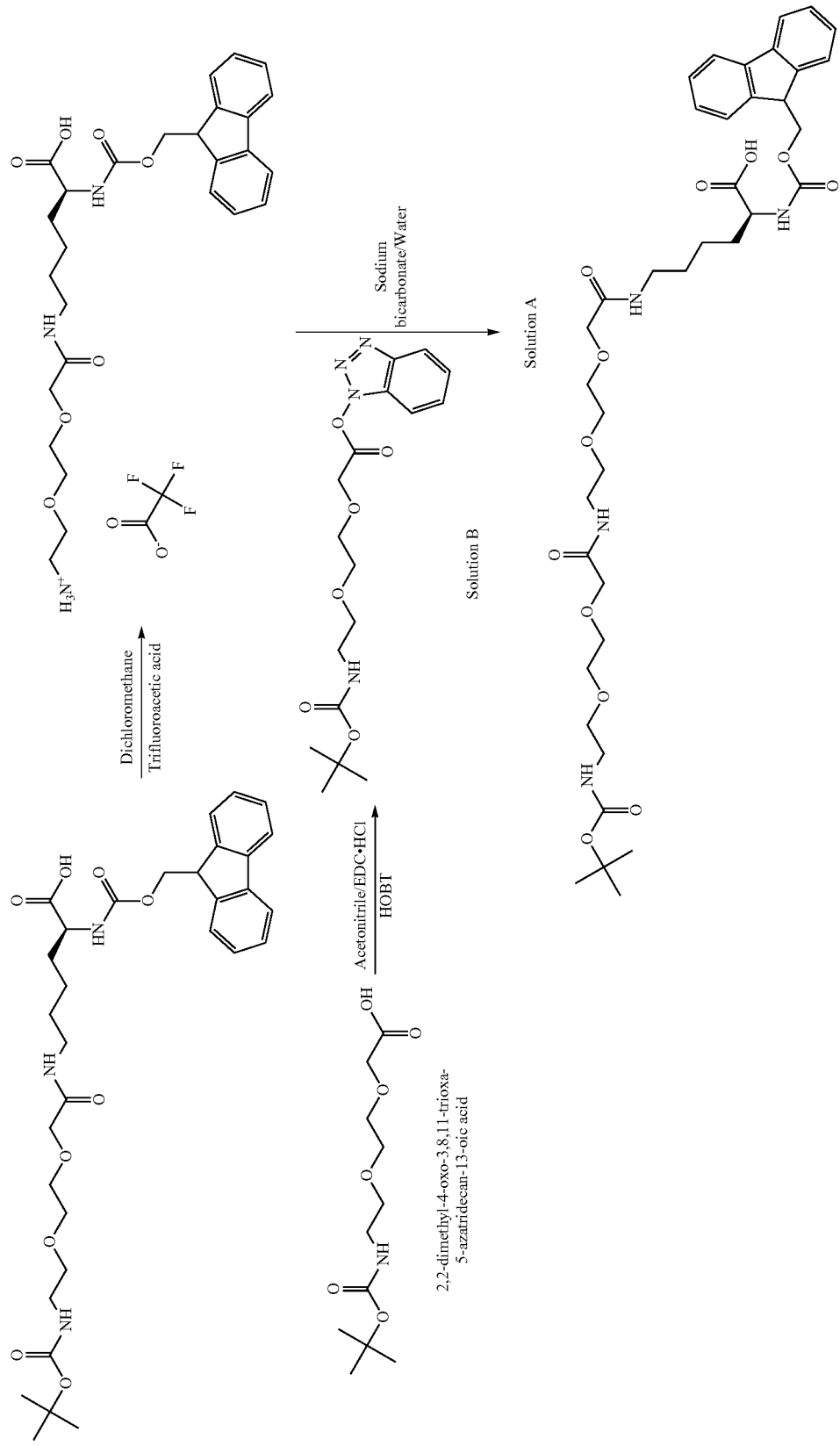

A: 10.0 g of $N^6$-(2,2-dimethyl-4,13-dioxo-3,8,11-trioxa-5-azatridecan-13-yl)-$N^2$—{[(9H-fluoren-9-yl)methoxy]carbonyl}-L-lysine was dissolved in 25 ml of dichloromethane. The solution was treated with Trifluoro acetic acid (25 mL) at ambient temperature. Reaction mixture was stirred for 2 hours at ambient temperature followed by removal of solvent to give white solid. To this white solid, 25 ml of water and Sodium bicarbonate (2.74 g) was added to make solution A.

B: In another flask, EDC·HCl (9.46 g) was added to the mixture of 2,2-dimethyl-4-oxo-3,8,11-trioxa-5-azatridecan-13-oic acid (10.0 g) and N-Hydroxy benzotriazole (5.13 g) in 50 ml of acetonitrile at ambient temperature. The resulting mixture was stirred for 3 hours at ambient temperature.

This solution B was added to the solution A at ambient temperature. The reaction mixture was stirred 1-2 hours and pH of the reaction mixture was adjusted to 3.0-3.5 with diluted phosphoric acid. Solvent was removed by evaporation and reaction mixture was extracted in ethyl acetate. Solid was isolated by addition of diisopropyl ether followed by filtration and drying (10.0 g). Reaction yield is ca. 90% (Purity 98.5%).

Example-3

Preparation of tert-butyl 18-[(2,5-dioxopyrrolidin-1-yl)oxy]-18-oxooctadecanoate

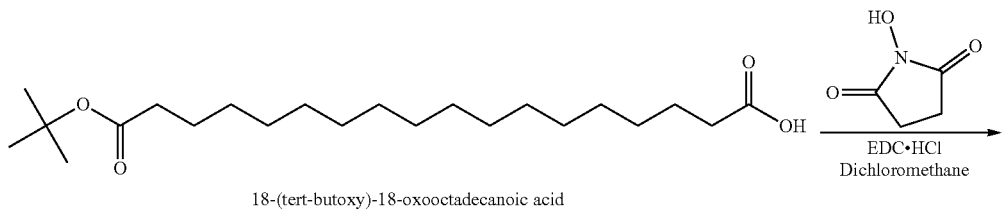

18-(tert-butoxy)-18-oxooctadecanoic acid

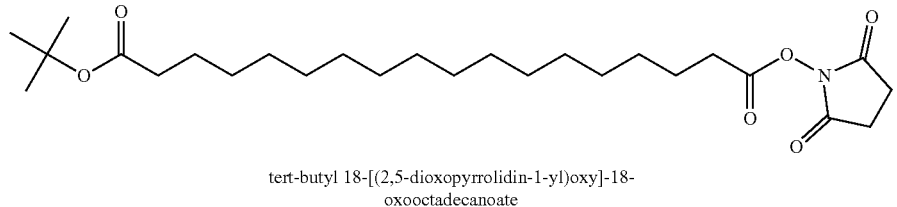

tert-butyl 18-[(2,5-dioxopyrrolidin-1-yl)oxy]-18-oxooctadecanoate

EDC·HCl (20.2 g) was added to a mixture of 18-(tert-butoxy)-18-oxooctadecanoic acid (30.0 g) and N-Hydroxy succinimide (12.1 g) in dichloromethane (300 mL). The mixture was stirred at ambient temperature. The reaction mixture was washed with sodium bicarbonate solution. After separation, the aqueous layer was extracted with dichloromethane (150 mL). Organic layer was washed with brine solution and concentrated under vacuum. The residue was crystallized with Isopropyl alcohol to afford tert-butyl 18-[(2,5-dioxopyrrolidin-1-yl)oxy]-18-oxooctadecanoate (36.0 g). Reaction yield is ca. 95% (Purity 99.5%).

Example-4

Preparation of (4S)-5-tert-butoxy-4-[(18-tert-butoxy-18-oxooctadecanoyl)amino]-5-oxopentanoic acid

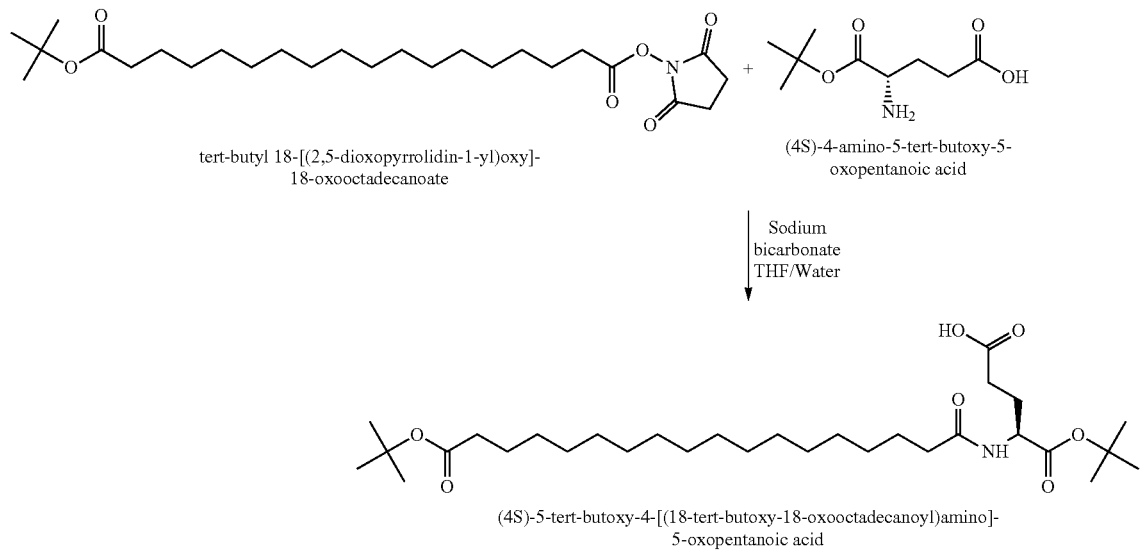 [SMILES: CC(C)(C)OC(=O)CCCCCCCCCCCCCCCCC(=O)ON1C(=O)CCC1=O ; CC(C)(C)OC(=O)[C@@H](N)CCC(=O)O ; CC(C)(C)OC(=O)CCCCCCCCCCCCCCCCC(=O)N[C@@H](CCC(=O)O)C(=O)OC(C)(C)C]

Sodium bicarbonate (1.8 g) was added to a mixture of tert-butyl 18-[(2,5-dioxopyrrolidin-1-yl)oxy]-18-oxooctadecanoate (5.0 g) and (4S)-4-amino-5-tert-butoxy-5-oxopentanoic acid (2.8 g) in THF and water mixture. The mixture was stirred at ambient temperature for 1-2 hours. THF was removed by evaporation and residue was diluted with water (50 mL) and pH was adjusted to 2.0-3.0. Product was extracted with ethyl acetate. The resulting mixture was concentrated under vacuum. The residue was crystallized with n-Heptane to afford (4S)-5-tert-butoxy-4-[(18-tert-butoxy-18-oxooctadecanoyl)amino]-5-oxopentanoic acid (5.5 g). Reaction yield is ca. 92% (Purity 99%).

Example-5

Preparation of 1-tert-butyl 5-(2,5-dioxopyrrolidin-1-yl)N-(18-tert-butoxy-18-oxooctadecanoyl)-L-glutamate

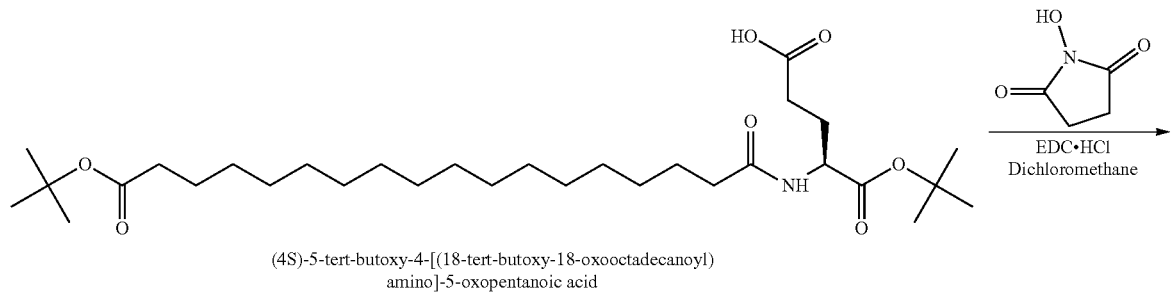

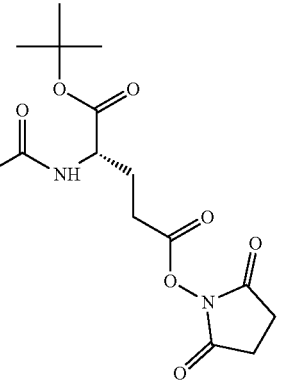

1-tert-butyl 5-(2,5-dioxopyrrolidin-1-yl) N-(18-tert-butoxy-
18-oxooctadecanoyl)-L-glutamate EDC·HCl (0.448 g) was added to a mixture of (4S)-5-tert-butoxy-4-[(18-tert-butoxy-18-oxooctadecanoyl)amino]-5-oxopentanoic acid (1.0 g) and N-Hydroxy succinimide (0.269 g) in dichloromethane. The mixture was stirred at ambient temperature till reaction completion. Reaction mixture was washed with sodium bicarbonate solution followed by brine washing and concentration under vacuum. The residue was crystallized in diisopropyl ether to afford 1-tert-butyl 5-(2,5-dioxopyrrolidin-1-yl)N-(18-tert-butoxy-18-oxooctadecanoyl)-L-glutamate (1.0 g). Reaction yield is ca. 94% (Purity 99.5%).

Example-6

Preparation of Semaglutide Side chain

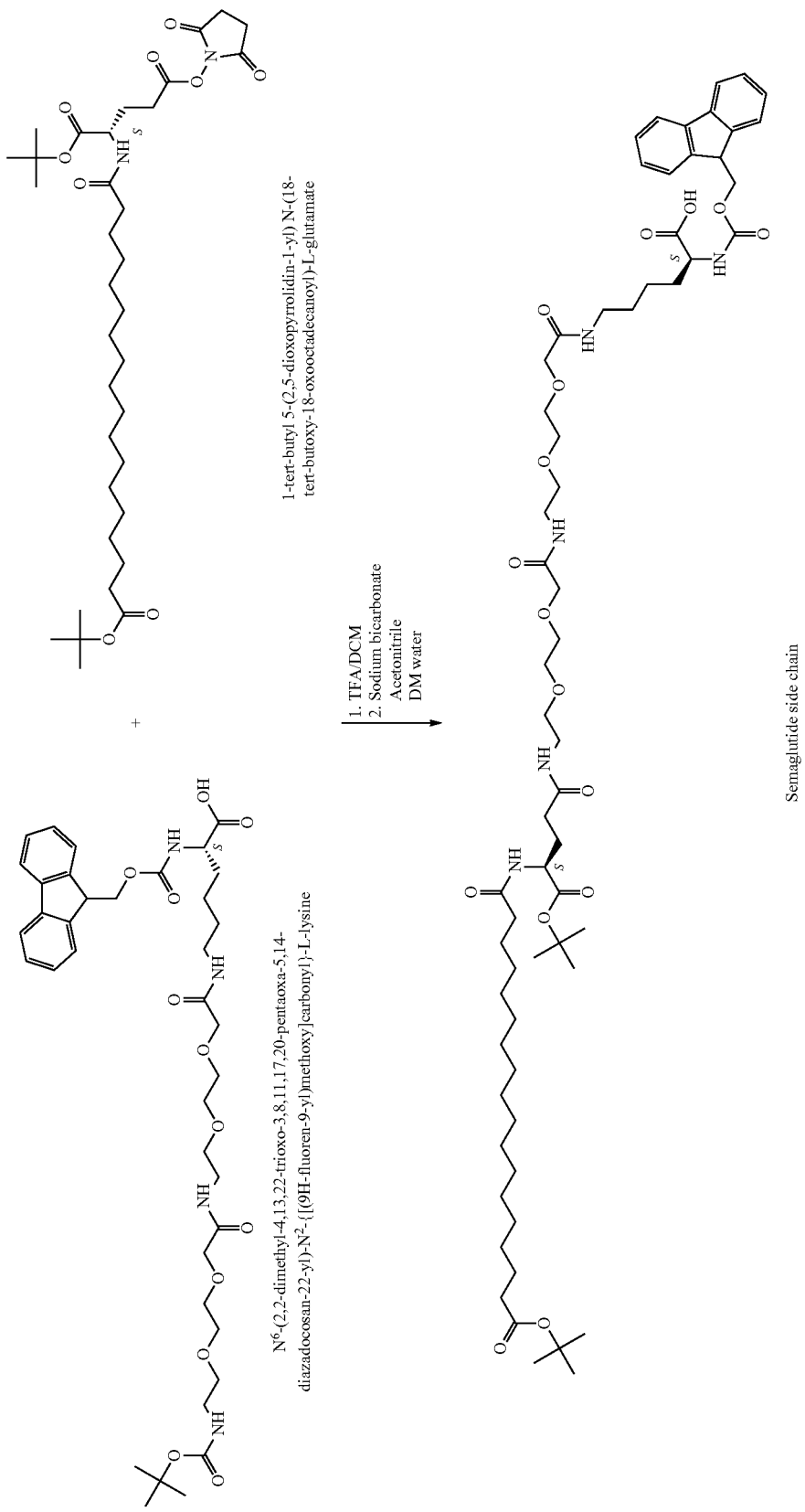

10.0 g of N$^6$-(2,2-dimethyl-4,13,22-trioxo-3,8,11,17,20-pentaoxa-5,14-diazadocosan-22-yl)-N$^2$—{[(9H-fluoren-9-yl)methoxy]carbonyl}-L-lysine was dissolved in 25 ml of dichloromethane. Solution was treated with Trifluoroacetic acid (25 mL) at ambient temperature. After completion of reaction, solvent was removed by evaporation, to give white solid. To this white solid, 25 ml of water and 2.21 g of Sodium bicarbonate was added followed by addition of 1-tert-butyl 5-(2,5-dioxopyrrolidin-1-yl)N-(18-tert-butoxy-18-oxooctadecanoyl)-L-glutamate (8.6 g) in 50 ml of acetonitrile at ambient temperature. After completion of reaction, pH of reaction mixture was adjusted to 3.0-3.5 with diluted phosphoric acid. Acetonitrile was removed by evaporation and reaction mixture was extracted with ethyl acetate. To this diisopropyl ether was added to give a white solid, (12.6 g). Reaction yield is ca. 90% (Purity 98.5%).

The invention claimed is:

1. A process for the preparation of the side chain of Semaglutide of Formula 1,

Formula 1

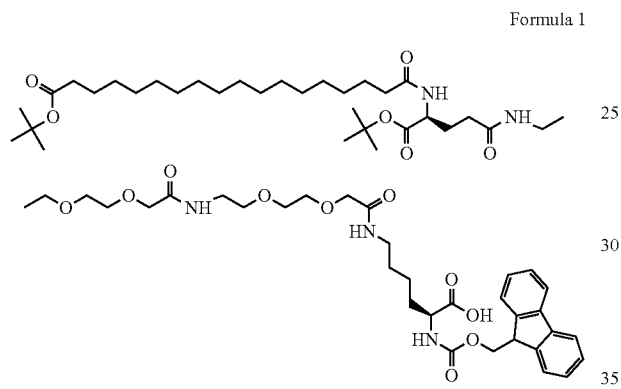

the process comprising:
  a) coupling a compound of Formula A

Formula A

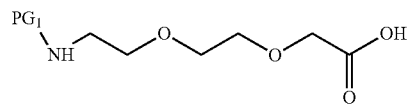

wherein PG$_1$ is a protecting group, cleavable under non-basic conditions, by activation of the carboxylic acid using a carboxylic acid activator in the presence of N-(3-dimethylaminopropyl)-N'-ethylcarbodiimide hydrochloride, with a compound of Formula B Formula B

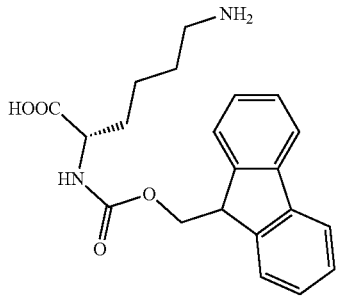

to obtain a compound of Formula C

Formula C

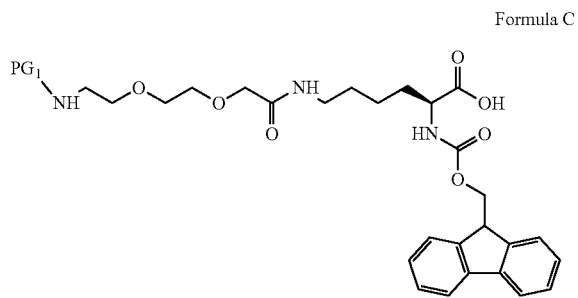

b) de-protecting the compound of Formula C to obtain a compound of Formula D or its salt Formula D

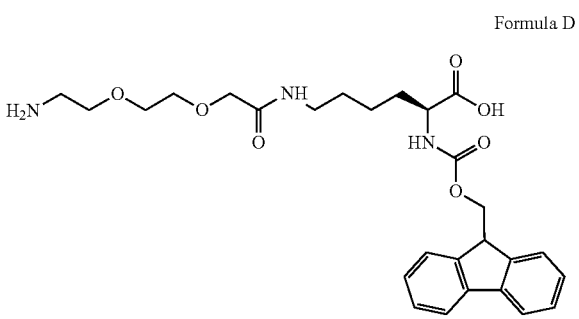 [SMILES: NCCOCCOCC(=O)NCCCC[C@H](NC(=O)OCC1c2ccccc2-c2ccccc21)C(=O)O]

c) reacting the compound of Formula D or its salt with a compound of Formula E;

Formula E

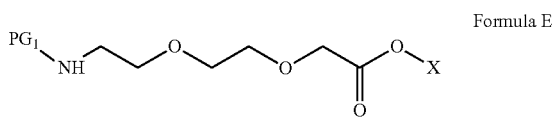

wherein COOX is an activated ester in the presence of a base, to obtain a compound of Formula F;

Formula F

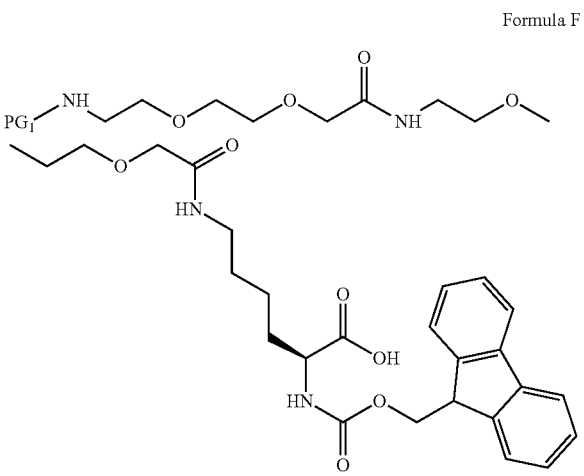

d) de-protecting the compound of Formula F, and e) reacting the reaction mixture of step d) with a compound of Formula G

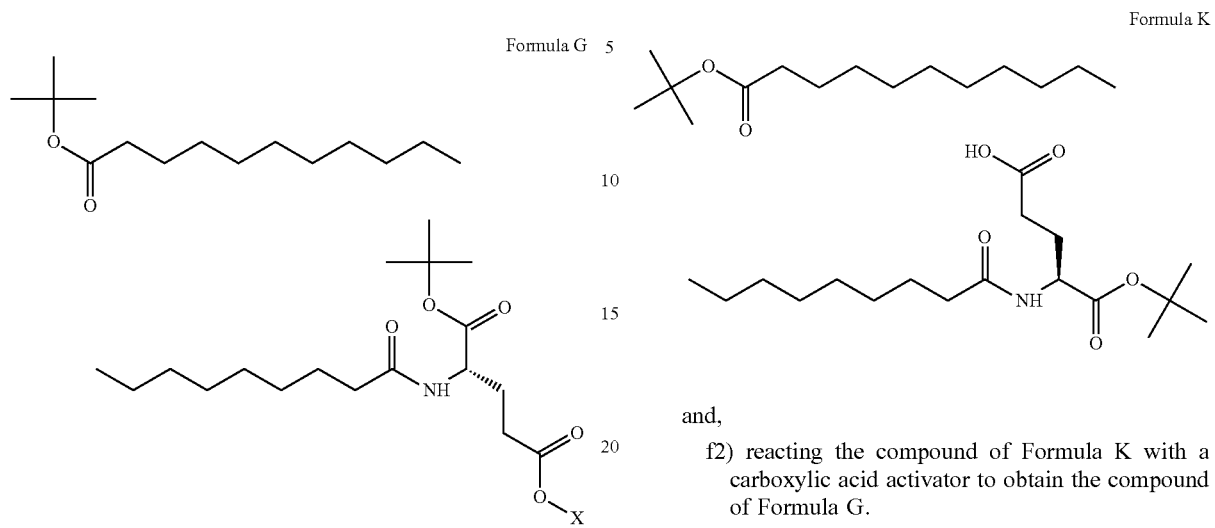

wherein, COOX is an activated ester in the presence of a base to obtain the compound of Formula 1;

wherein:
i) the compound of Formula E used in step c) is prepared by a process comprising the reaction of a compound of Formula $E_1$

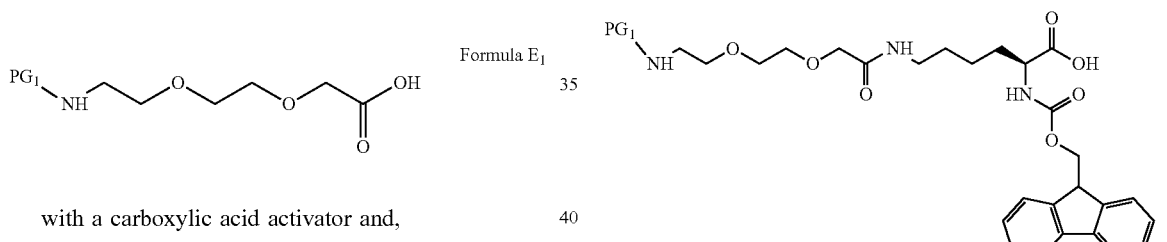

with a carboxylic acid activator and, ii) the compound of Formula G used in step e) is prepared by a process comprising the steps of:

f1) coupling a compound of Formula H

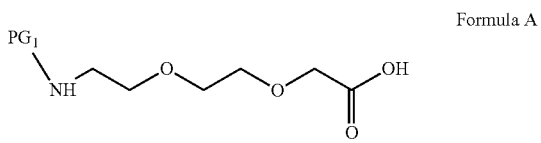

by activation of the carboxylic acid, with a compound of Formula J

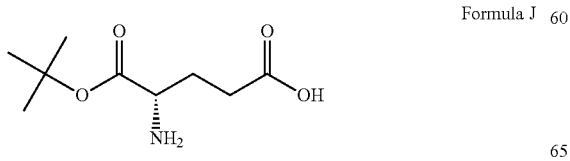

to obtain a compound of Formula K

[Formula K structure]

and, f2) reacting the compound of Formula K with a carboxylic acid activator to obtain the compound of Formula G.

2. The process according to claim 1, wherein the base of step c) and step e) is triethylamine, N'N-diisopropylethylamine, sodium bicarbonate or sodium carbonate.

3. A process for the preparation of a compound of Formula C;

[Formula C structure]

wherein $PG_1$ is a protecting group, cleavable under non-basic conditions, the process comprising:

a) reacting a compound of Formula A;

[Formula A structure]

with a carboxylic acid activator in the presence of N-(3-Dimethylaminopropyl)-N'-ethylcarbodiimide hydrochloride in a polar aprotic solvent selected from N,N-dimethylformamide, dimethyl sulfoxide and tetrahydrofuran, and b) reacting the reaction mixture of step a) with a compound of Formula B;

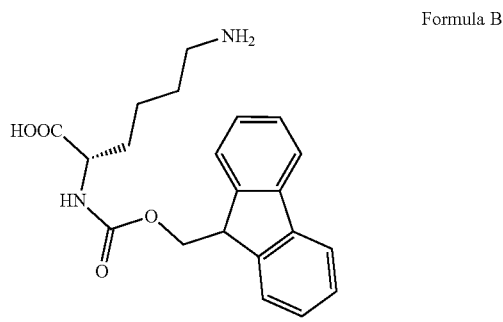 [SMILES: NCCCC[C@H](NC(=O)OCC1c2ccccc2-c2ccccc21)C(=O)O]

Formula B in the presence of N'N-diisopropylethylamine to obtain a compound of Formula C.

4. The process according to claim 3 further comprising converting the compound of Formula C into the side chain of Semaglutide of Formula 1;

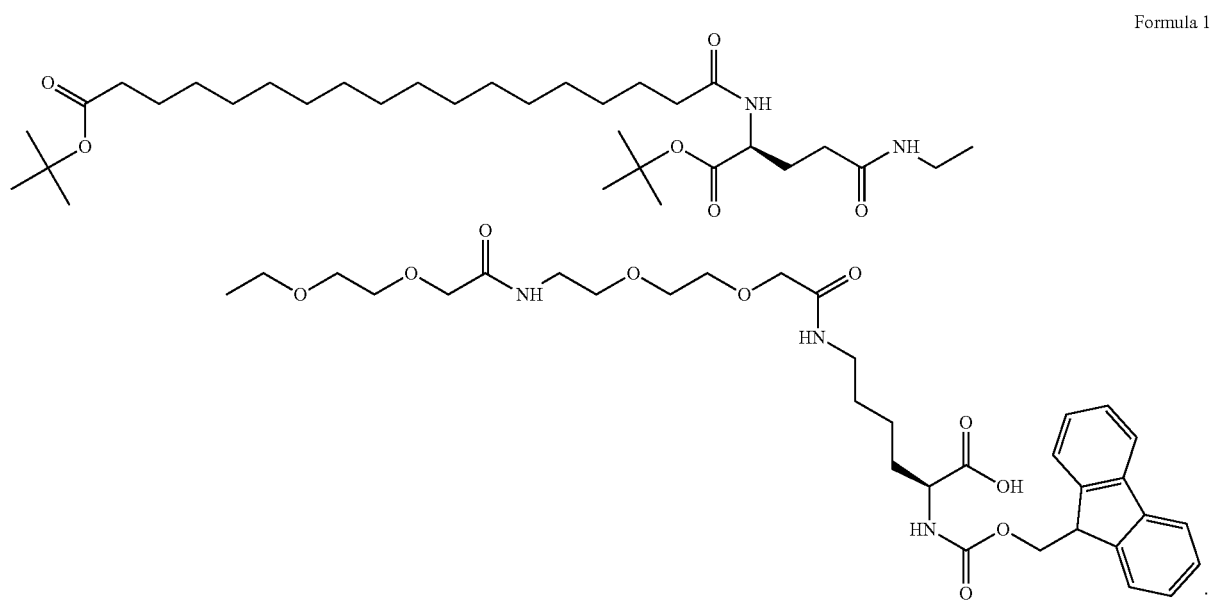

Formula 1

5. A process for the preparation of a compound of Formula G;

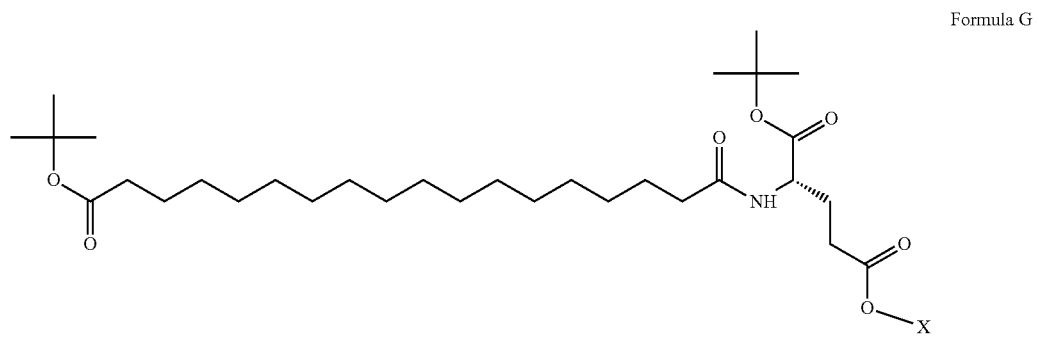

Formula G wherein, COOX is an activated ester, the process comprising reacting a compound of Formula K;

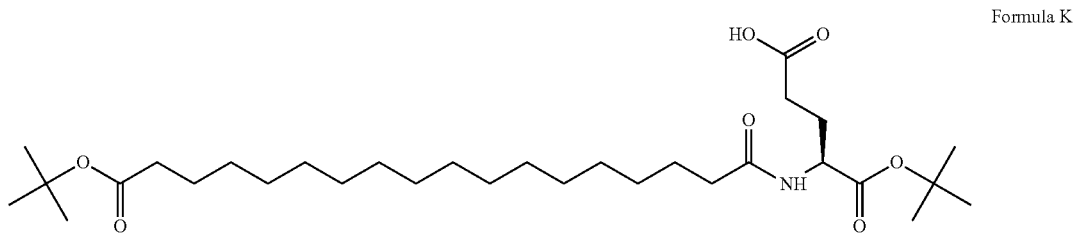 [SMILES: CC(C)(C)OC(=O)CCCCCCCCCCCCCCCCC(=O)N[C@@H](CCC(=O)O)C(=O)OC(C)(C)C]

Formula K with a carboxylic acid activator in the presence of N-(3-Dimethylaminopropyl)-N'-ethylcarbodiimide hydrochloride.

6. The process according to claim 5, wherein the reaction is carried out in the presence of a solvent which is dichloromethane, chloroform, acetone, acetonitrile, tetrahydrofuran, dimethylsulphoxide and N,N-dimethylformamide or a mixture thereof.

7. The process according to claim 5 further comprising converting the compound of Formula G into the side chain of Semaglutide of Formula 1;

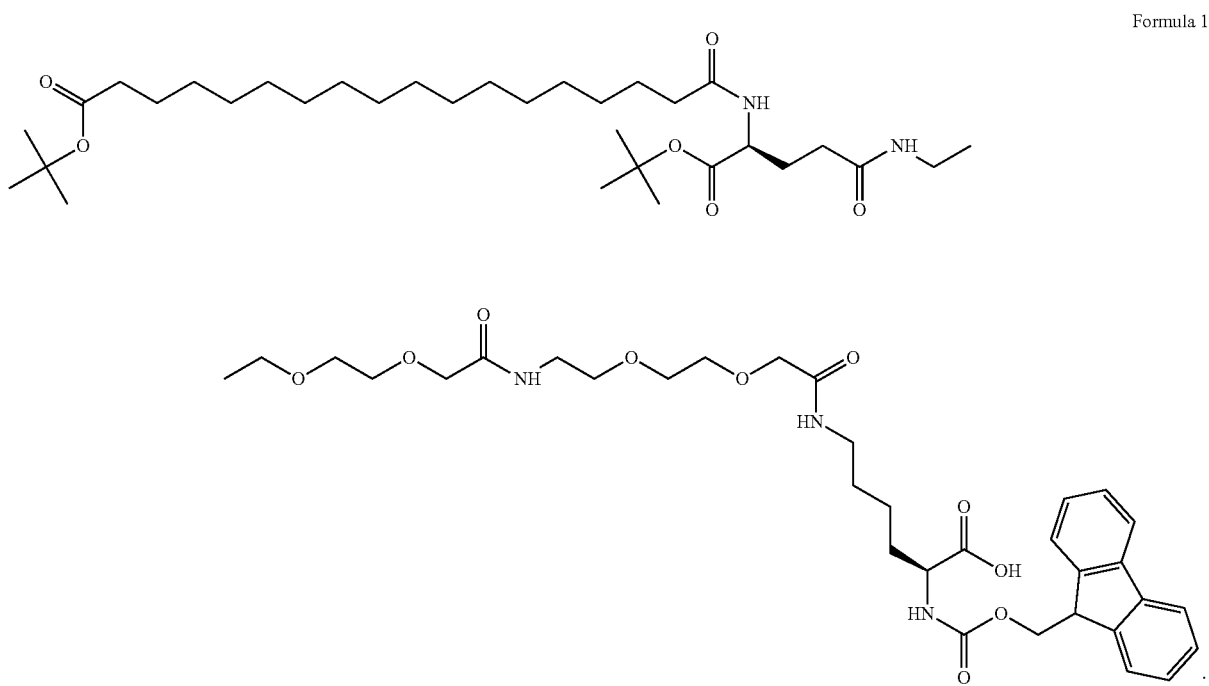

Formula 1

8. R A process for the preparation of a compound of Formula I;

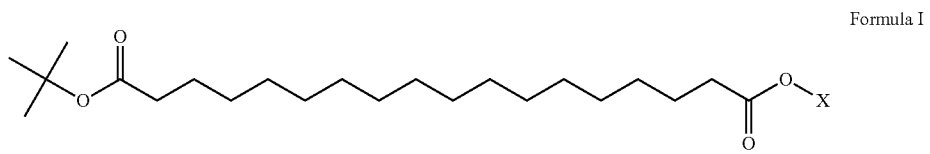

Formula I wherein, COOX is an activated ester, the process comprising reacting a compound of Formula H;

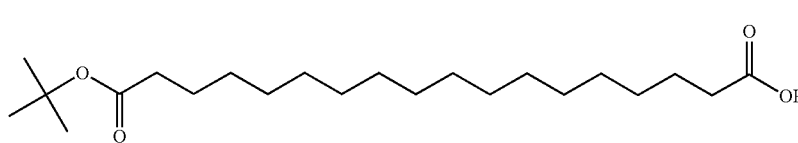
Formula H with a carboxylic acid activator in the presence of N-(3-Dimethylaminopropyl)-N'-ethylcarbodiimide hydrochloride in a solvent to obtain a compound of Formula I.

9. The process according to claim 8, wherein the solvent is dichloromethane, chloroform, acetone, acetonitrile, tetrahydrofuran, dimethylsulphoxide and N,N-dimethylformamide or a mixture thereof.

10. The process according to claim 8 further comprising converting a compound of Formula I into the compound of Formula 1;

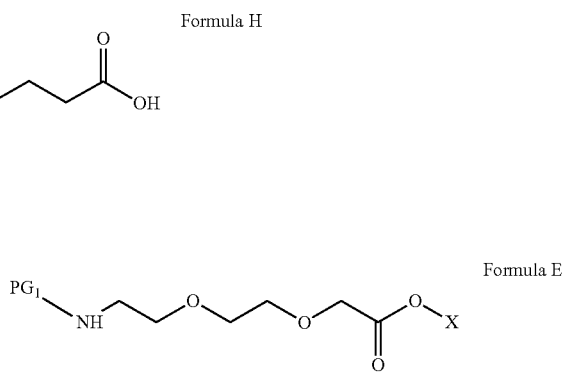
Formula E wherein $PG_1$ is a protecting group, and COOX is an activated ester comprising a reaction of a compound of Formula $E_1$;

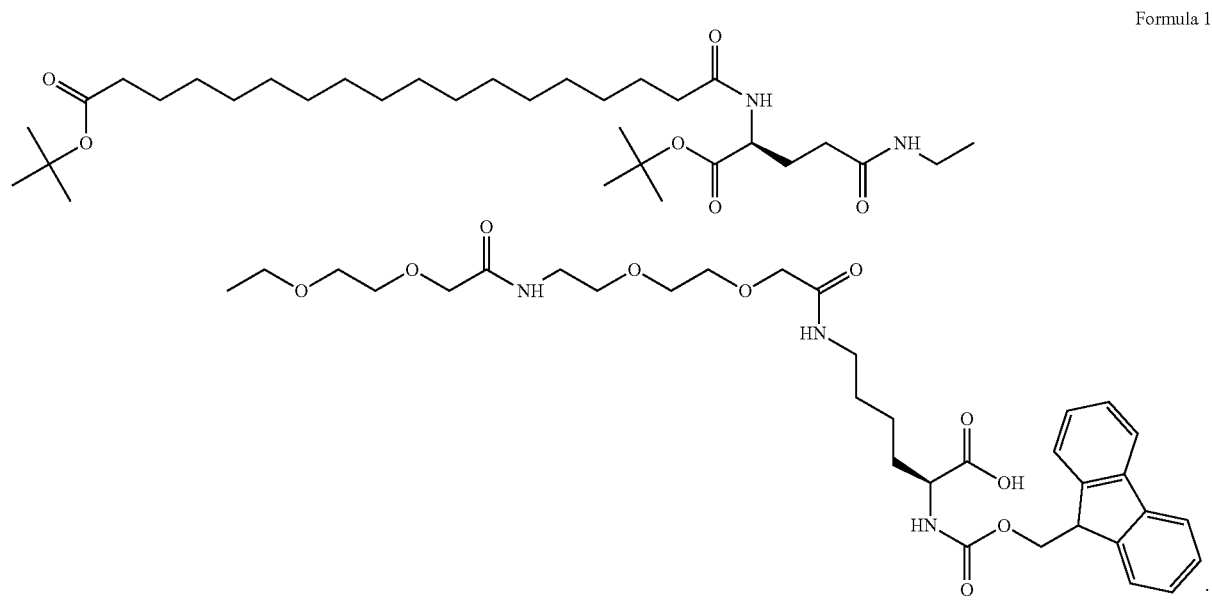
Formula 1

11. An isolated compound of Formula EB;

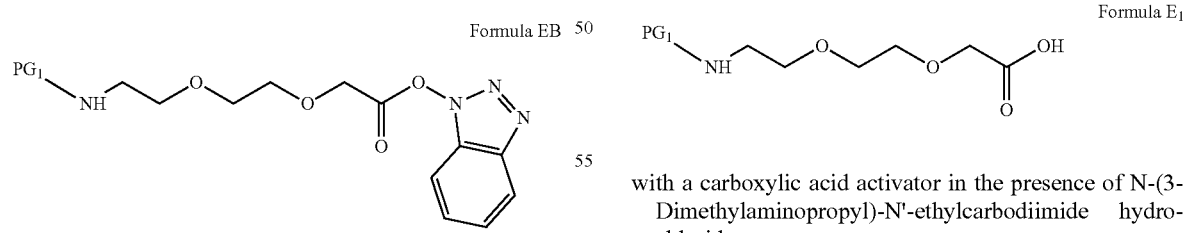
Formula EB wherein $PG_1$ is a protecting group.

12. A process for the preparation of a compound of Formula E;

Formula $E_1$ with a carboxylic acid activator in the presence of N-(3-Dimethylaminopropyl)-N'-ethylcarbodiimide hydrochloride.

13. The process according to claim 12, wherein the reaction is carried out in the presence of a solvent which is dichloromethane, chloroform, acetone, acetonitrile, tetrahydrofuran, dimethylsulphoxide and N,N-dimethylformamide or a mixture thereof.

14. The process according to claim 12 further comprising converting the compound of Formula E into the side chain of Semaglutide of Formula 1;

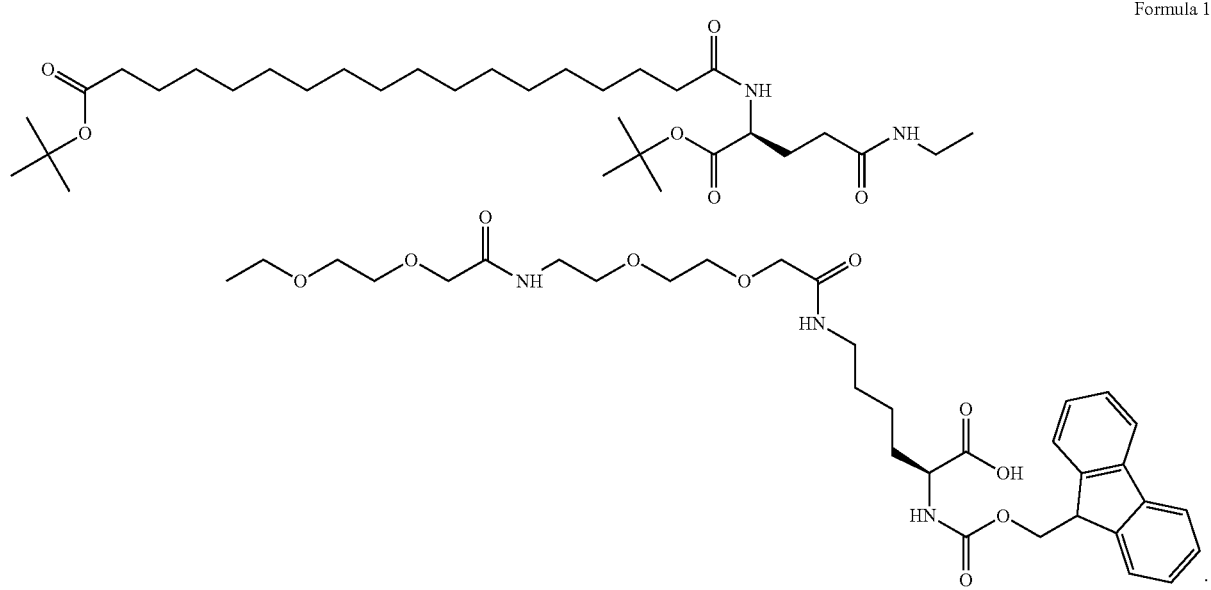
Formula 1
* * * * *